(12) United States Patent
Bills et al.

(10) Patent No.: US 11,494,549 B2
(45) Date of Patent: Nov. 8, 2022

(54) MOBILE REPORTS

(71) Applicant: Palantir Technologies Inc., Palo Alto, CA (US)

(72) Inventors: Cooper Bills, Palo Alto, CA (US); David Skiff, Palo Alto, CA (US); Zachary Bush, Palo Alto, CA (US); Ben Thomas, Heber, UT (US); Evan Minamoto, Menlo Park, CA (US); Allen Cai, Menlo Park, CA (US); Alex Cochran, Los Angeles, CA (US)

(73) Assignee: PALANTIR TECHNOLOGIES INC., Denver, CO (US)

( * ) Notice: Subject to any disclaimer, the term of this patent is extended or adjusted under 35 U.S.C. 154(b) by 0 days.

(21) Appl. No.: 17/219,559

(22) Filed: Mar. 31, 2021

(65) Prior Publication Data

US 2021/0248310 A1    Aug. 12, 2021

Related U.S. Application Data

(63) Continuation of application No. 15/962,402, filed on Apr. 25, 2018, now Pat. No. 10,997,363, which is a (Continued)

(51) Int. Cl.
*G06F 40/174* (2020.01)
*H04W 4/021* (2018.01)
(Continued)

(52) U.S. Cl.
CPC .......... *G06F 40/174* (2020.01); *G06F 40/186* (2020.01); *H04W 4/021* (2013.01); *H04W 4/029* (2018.02); *H04W 4/08* (2013.01)

(58) Field of Classification Search
CPC .............................. H04W 4/021; H04W 4/029
See application file for complete search history.

(56) References Cited

U.S. PATENT DOCUMENTS

2005/0108261 A1* 5/2005 Glassy .................... G06F 16/29
2006/0230033 A1* 10/2006 Halevy ................ G06F 40/174
(Continued)

OTHER PUBLICATIONS

U.S. Appl. No. 15/962,402, filed Apr. 25, 2018.
U.S. Appl. No. 13/831,199, filed Mar. 14, 2013.

*Primary Examiner* — Asher D Kells
(74) *Attorney, Agent, or Firm* — Hickman Becker Bingham Ledesma LLP

(57) ABSTRACT

In one embodiment, a mobile data analysis system generates mobile reports. In this context, a mobile report represents information collected by a mobile device user and provided as input to a report form displayed by an associated mobile device. The collected information may, for example, include information relating to an activity or event, information relating to a particular person, entity, or location, or any combination thereof. A mobile report may be based on a report template. A report template defines one or more data fields and other property information to be included in a mobile report. A mobile report may be sent to a server to generate one or more data objects, and one or more data object links between the data objects from a first mobile report, the data objects from a second mobile report, and exiting data objects that are maintained at the server.

20 Claims, 15 Drawing Sheets

Related U.S. Application Data continuation of application No. 13/831,199, filed on Mar. 14, 2013, now Pat. No. 10,037,314.

(51) Int. Cl.
*H04W 4/08* (2009.01)
*H04W 4/029* (2018.01)
*G06F 40/186* (2020.01)

(56) References Cited

U.S. PATENT DOCUMENTS

| | | | |
|---|---|---|---|
| 2007/0070233 A1* | 3/2007 | Patterson | H04N 1/32128 348/333.12 |
| 2011/0093458 A1* | 4/2011 | Zheng | G06F 16/29 707/E17.109 |
| 2012/0216106 A1* | 8/2012 | Casey | G06F 40/174 715/224 |
| 2013/0332068 A1* | 12/2013 | Kesar | G01C 21/367 345/589 |
| 2014/0176606 A1* | 6/2014 | Narayan | G06F 16/58 345/633 |

* cited by examiner

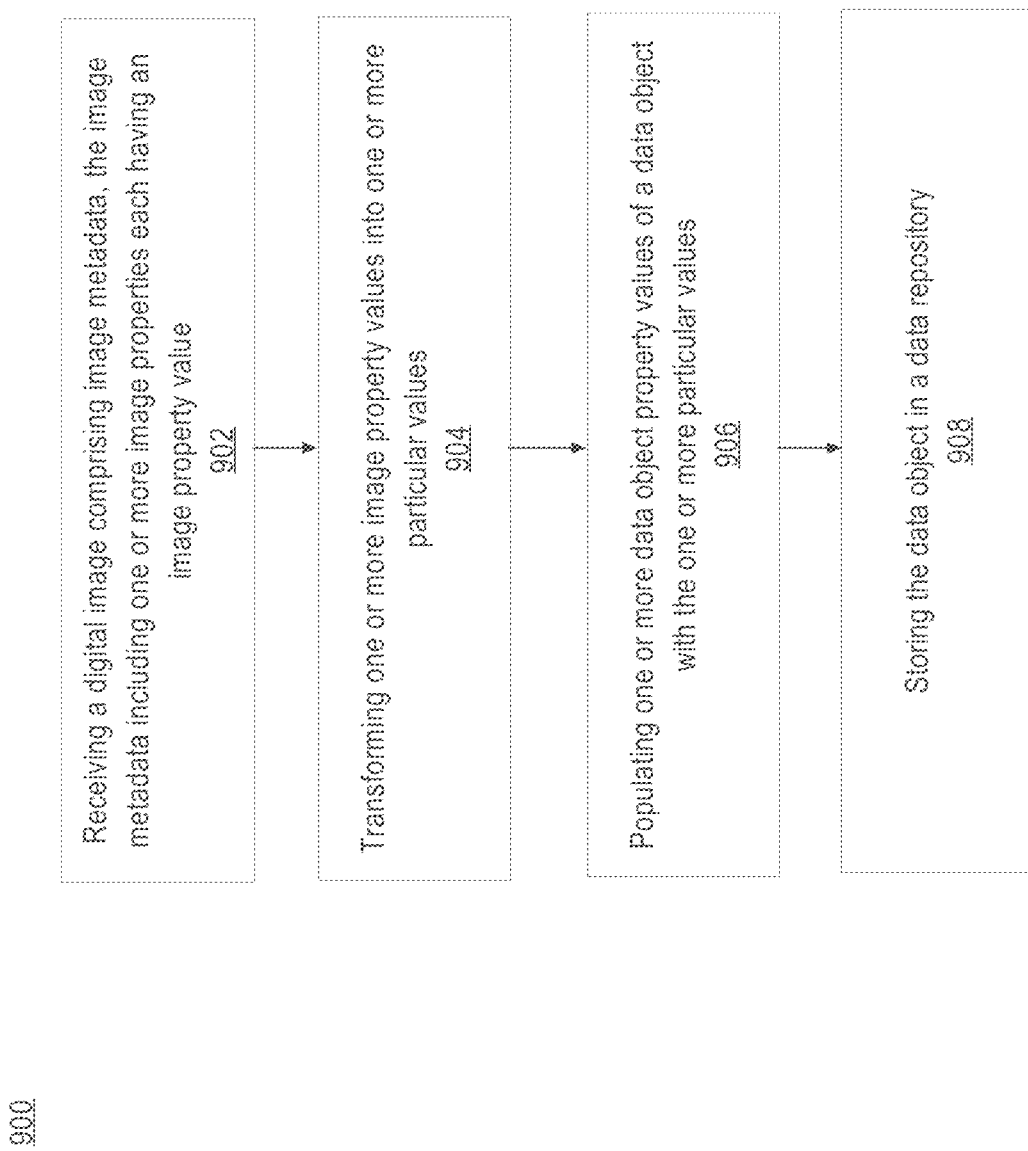

FIG. 11

MOBILE REPORTS

BENEFIT CLAIM

This application claims the benefit as a continuation of application Ser. No. 15/962,402, filed Apr. 25, 2018, which is a continuation of application Ser. No. 13/831,199, filed Mar. 14, 2013, now U.S. Pat. No. 10,037,314, issued Jul. 31, 2018, the entire contents of each of which are hereby incorporated by reference as if fully set forth herein, under 35 U.S.C. § 120. The applicant hereby rescinds any disclaimer of claim scope in the parent application or the prosecution history thereof and advises the USPTO that the claims in this application may be broader than any claim in the parent application.

TECHNICAL FIELD

The present disclosure generally relates to data analysis. The disclosure relates more specifically to a data analysis system that includes one or more mobile devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many organizations frequently conduct operations that include organization members performing activities in a dispersed geographic area. For example, the operations of a law enforcement agency typically include police officers patrolling assigned geographic areas, responding to crime scenes, and interviewing suspects and witnesses. As another example, a disaster relief organization may respond to a natural disaster by sending out aid workers to a disaster area to locate and provide assistance to those in crisis. These types of operations may be referred to as field operations and may generally include monitoring specific geographic areas and subjects, interacting with persons of interest, responding to and reporting information about the occurrence of notable events, and any other activities that an organization member may perform in the field.

In order to better coordinate field operations, an organization may employ one or more other organization members at a centralized location, referred to herein as operations analysts, that help coordinate the activities of the organization members in the field, referred to herein as field analysts. For example, operations analysts may be responsible for instructing field analysts on particular locations to investigate or subjects to monitor. Similarly, field analysts may be expected to communicate certain information related to the field operations back to operations analysts.

Both field analysts and operations analysts face a number of challenges in efficiently conducting field operations. These challenges include enabling field analysts to maintain a situational awareness of the environment in which the field analysts are operating, including maintaining an awareness of the location and activities of other field analysts. Additionally, field analysts typically lack efficient access to information that may have been previously collected and shared by other field analysts and to real-time updates of such shared information. Operations analysts similarly lack ways of maintaining a meaningful awareness of the activities of a possibly large number of field analysts for whom the operation analysts are responsible and sharing detailed information with those field analysts.

BRIEF DESCRIPTION OF THE DRAWINGS

In the drawings:

FIG. 9 illustrates a process flow for creating a data object from a digital image.

FIG. 11 illustrates an example graphical user interface that is configured to enable a user to modify information associated with a data object.

FIG. 13 illustrates a process flow for generating mobile reports based on report templates, according to an embodiment.

DETAILED DESCRIPTION

Figure 1:
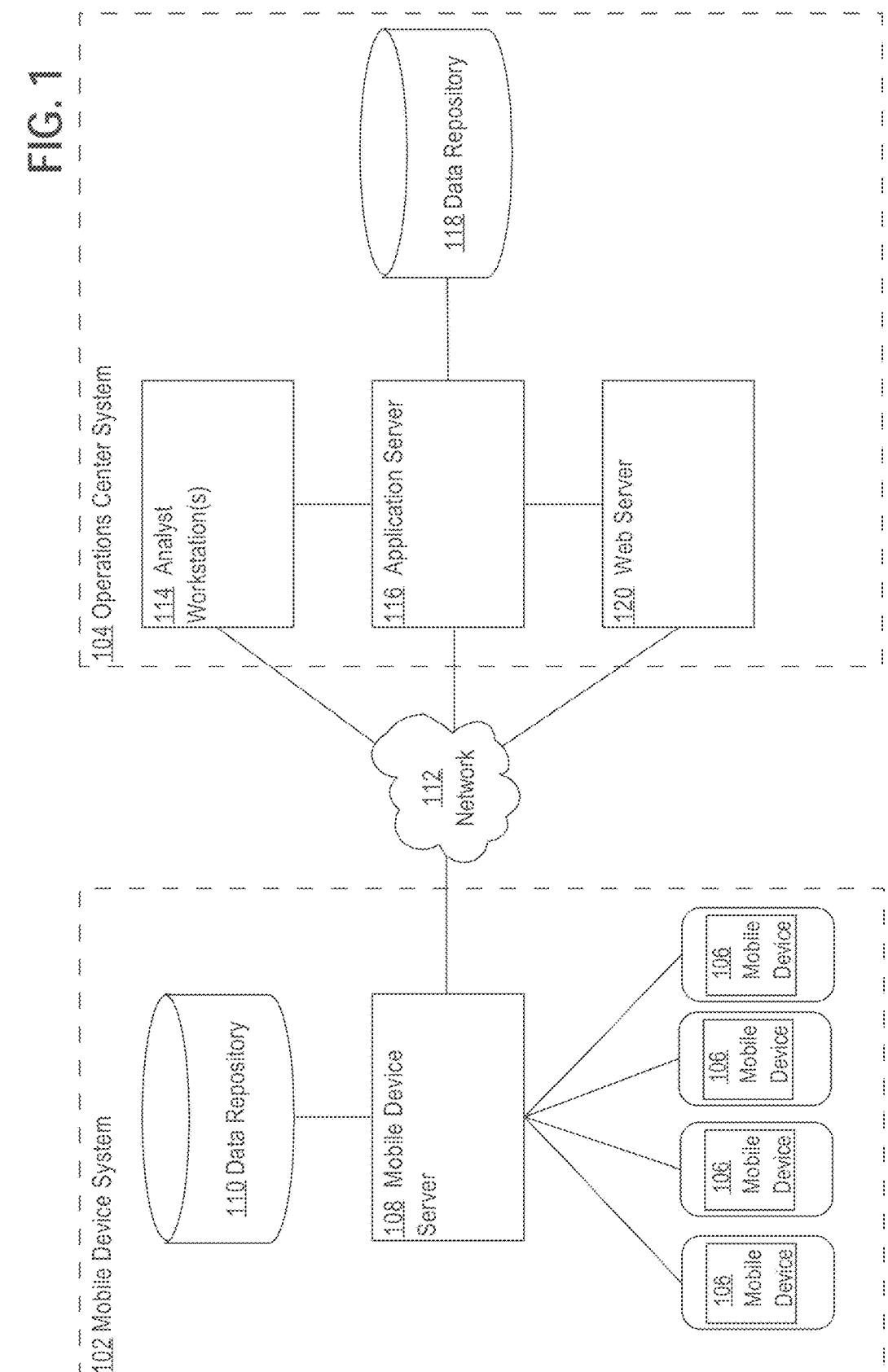
FIG. 1 illustrates an example networked computer system in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described herein according to the following outline:

1.0 General Overview
2.0 Structural Overview
3.0 Architectural and Functional Overview
3.1 Mobile Device System Architecture
3.2 Operations Center System Architecture
3.3 Configuring Mobile Device Teams 3.4 Mobile Device Tracking
3.5 Mobile Device Messaging
3.6 Creating Data Objects from Images
3.7 Mobile Device Search
3.8 Mobile Device Reports
4.0 Implementation Mechanisms—Hardware Overview 1.0 General Overview The appended claims may serve as a summary of the invention.

According to various embodiments, a mobile data analysis system and methods are provided that enable mobile device location tracking, secure messaging, real-time data access and analysis, and other features described herein.

In one embodiment, a mobile data analysis system is configured to generate mobile reports. In this context, a mobile report represents information collected by a mobile device user and provided as input to a report form displayed by an associated mobile device. The collected information may, for example, include information relating to an activity or event, information relating to a particular person, entity, or location, or any combination thereof. As one example, a police officer using a mobile device may generate various mobile reports that include information relating to suspect interviews, traffic stops, crime scene investigations, and any other activities conducted by the police officer.

In one embodiment, a mobile report may be based on a report template. A report template defines one or more data fields and other property information to be included in a mobile report based on the report template. In an embodiment, a report template may be created remotely and made available to one or more mobile devices for use by users of the mobile devices. Any number of different report templates may be created depending on various types of information desired for reporting. Referring again to the example of a police officer, separate report templates may be created for suspect interviews, traffic stops, and any other information a police officer may report. Report templates may be used to enable consistency between mobile reports submitted by different mobile device users at different times and to facilitate integration of mobile report data into a larger data collection of data objects. A mobile report created by a mobile device user may be sent to a server that generates one or more data objects, and one or more data object links between the data objects, based on input data contained in the mobile report.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0 Structural Overview

FIG. 1 illustrates an example of a mobile data analysis system 100 in accordance with an embodiment. A mobile data analysis system 100 generally facilitates the communication and the exchange of data between one or more mobile devices (e.g., mobile devices 106), one or more analyst workstations (e.g., analyst workstations 114), and information stored in one or more data repositories (e.g., data repositories 110, 118). The example mobile data analysis system 100 is conceptually described herein as comprising a mobile device system 102 supporting one or more mobile devices 106 and that is interconnected over a network 112 to an operations center system 104 supporting one or more analyst workstations 114 and other computing resources; however, the mobile data analysis system 100 represents just one system arrangement and other system arrangements are possible.

In an embodiment, a mobile device system 102 comprises mobile devices 106, mobile device server 108, and data repository 110. Each of mobile devices 106 generally may comprise any mobile computing device including, without limitation, a smartphone, a cellular phone, a tablet, a laptop, and a personal digital assistant (PDA). Each of mobile devices 106 is communicatively coupled to mobile device server 108 via one or more wireless links that may include, for example, cellular, Wi-Fi, WiMAX, ZigBee, microwave, and other wireless network links. For the purposes of illustrating a clear example, four mobile devices 106 and one mobile device server 108 are shown in FIG. 1, but practical implementations may use hundreds or thousands of mobile devices and any number of mobile devices servers.

In an embodiment, mobile device server 108 may be communicatively coupled to resources of operations center system 104 via network 112, which broadly represents one or more local area networks, wide area networks, global interconnected internetworks such as the public internet, or a combination thereof. Mobile device server 108 generally may be configured to coordinate communication between mobile devices 106 and resources of operations center system 104 and to access and retrieve data stored in data repository 110. For example, mobile device server 108 may be configured to relay search requests, messages, and other data sent from mobile devices 106 to resources of operations center system 104, and to send information received from operations center system 104 to the appropriate mobile devices 106.

In an embodiment, operations center system 104 comprises one or more analyst workstations 114, application server 116, data repository 118, and web server 120. One or more components of operations center system 104 may, for example, be located in a centralized location that is remote from mobile device system 102 and mobile devices 106.

In an embodiment, analyst workstations 114 comprise one or more workstation computers, server computers, laptop computers, mobile devices, or combinations thereof. Analyst workstations 114 generally are configured to support one or more operations analysts that may request information provided by application server 116 and/or web server 120, send information to application server 116 to be stored in data repository 118, communicate with one or more field analysts using mobile devices 106, and perform other operations described herein.

In an embodiment, application server 116 generally is configured to access and retrieve data stored in data repository 118 in response to requests from mobile devices 106, mobile device server 108, analyst workstations 114, and web server 120. Application server 116 may perform data manipulations and other operations in response to receiving requests to access and/or store data in data repository 118.

3.0 Architectural and Functional Overview 3.1 Mobile Device System Architecture

Figure 2:
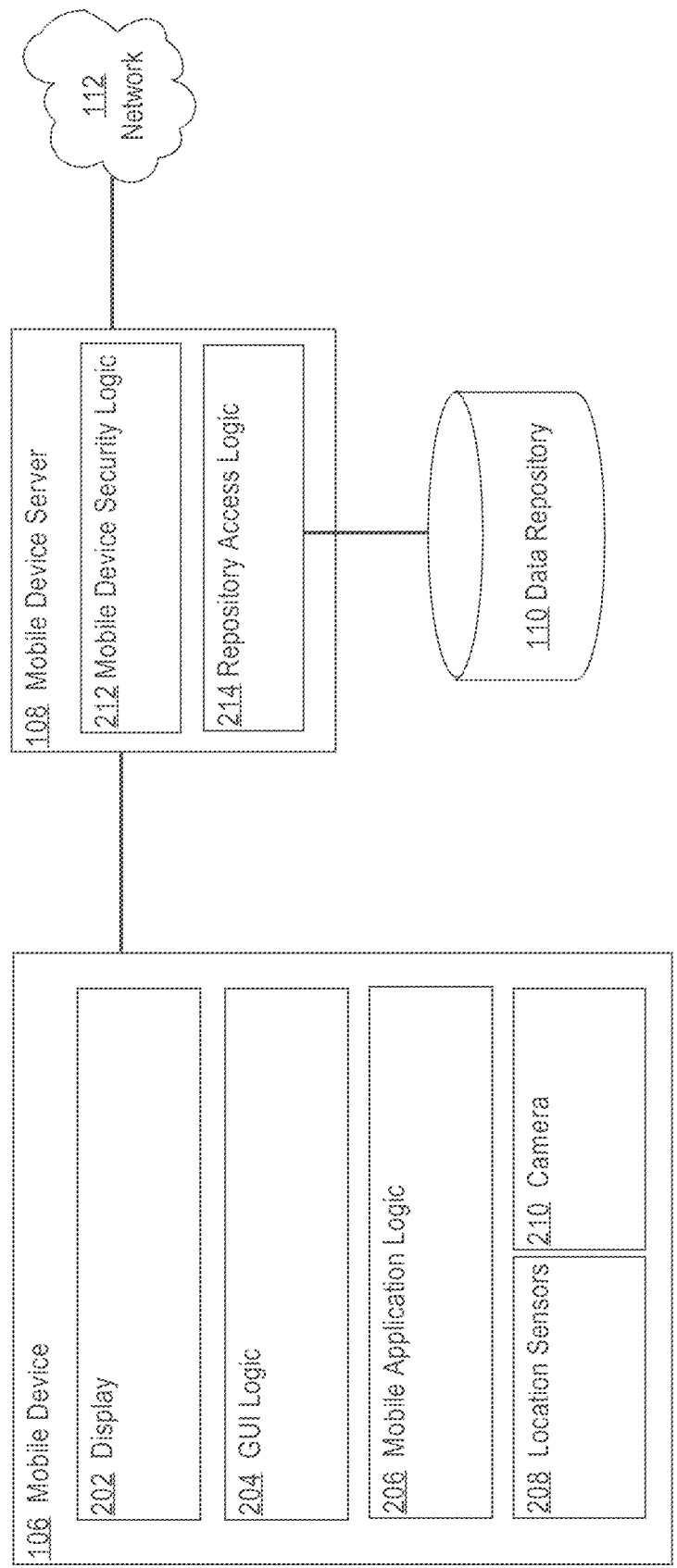
FIG. 2 illustrates an example mobile device system in accordance with an embodiment.

FIG. 2 illustrates an example mobile device system architecture 200. In an embodiment, a mobile device system architecture 200 comprises one or more mobile devices 106, mobile device server 108, and data repository 110.

In the embodiment illustrated in FIG. 2, a mobile device 106, which may be implemented by one or more physical computing devices, is communicatively coupled to mobile device server 108, which may be implemented by one or more second physical computing devices, over one or more wireless networks. A mobile device 106 comprises a display 202, graphical user interface (GUI) logic 204, mobile application logic 206, location sensors 208, and camera 210.

In an embodiment, GUI logic 204 may be a set of program instructions which, when executed by one or more processors of a mobile device 106, are operable to receive user input and to display a graphical representation of one or more graphic constructs related to the mobile data analysis system approaches described herein. As an example, a mobile device 106 may be a smartphone and GUI logic 204 may be operable to receive touch screen signals and other user input from, and display the graphics constructs to, a graphical user interface that is provided on display 202. Touch screen signals may comprise selecting buttons, holding down buttons, selecting items displayed on the screen, dragging, or other gestures or selections. In general, GUI logic 204 is configured to receive user input and determine what user requests or commands are represented by the user input.

In an embodiment, a mobile device 106 includes mobile application logic 206, which may comprise firmware, hardware, software, or a combination thereof in various embodiments that is configured to implement the functions of a mobile data analysis system on a mobile device as described herein. In one embodiment, mobile application logic 206 may be implemented as part of an application program configured to execute on the Android operating system. In other embodiments, mobile application logic 206 may be implemented as a combination of programming instructions written in any programming language (e.g., C++ or Java) and hardware components (e.g. memory, CPU time) that have been allocated for executing the program instructions on a mobile device 106.

In an embodiment, location sensors 208 generally represent any sensors which may be used to determine information associated with a geographic location, spatial orientation, device movement, or any other information associated with the physical presence of a mobile device 106, and which may be referred to herein as location data. Location data may include, for example, latitudinal and longitudinal coordinates, elevation measures, cardinal direction information, movement information, etc. For example, location sensors 208 may comprise a Global Positioning System (GPS) component, motion sensors (e.g., an accelerometer), rotation sensors (e.g., a gyroscope), a compass, and a magnetometer. In an embodiment, mobile application logic 206 is operable to receive location data from location sensors 208 and to send the location data to a mobile device server 108, which in turn may send the location data to resources of operations center system 104. The receiving and sending of location data by mobile application logic 206 may be performed periodically, at user configured intervals, or based on any other schedule.

In an embodiment, camera 210 generally represents any component capable of capturing multimedia information such as images, video, and sound. Camera 210 may be integrated into a mobile device 106 or may be an external device communicatively coupled to a mobile device 106.

In an embodiment, mobile device server 108 comprises mobile device security logic 212 and repository access logic 214.

In an embodiment, mobile device security logic 212 provides processes for controlling access to the mobile data analysis system by mobile devices. For example, access by mobile devices 106 to mobile device server 108, and via mobile device server 108 to resources of operations center system 104 over network 112, may be restricted and/or secured. As such, access by a mobile device user to a mobile device 106 and/or mobile device server 108 may be based on the user supplying an authorized mobile device user account and associated passwords, secret questions, personal identification numbers (PINs), biometrics, and/or any other suitable authentication mechanism. Mobile device security logic 212 comprise a set of program instructions configured to process mobile device user login requests sent from a mobile device 106.

In one embodiment, user access to a mobile device 106, mobile device server 108, and one or more of the resources of operations center system 104 may be protected by separate authentication mechanisms. In another embodiment, mobile device security logic 212 may be configured to implement a Single Sign-On (SSO) access control system in order to provide a single point of authentication for mobile device users. An SSO access control system generally enables a system resource, such as mobile device server 108, to process access credentials supplied by a mobile device user and, if a successful login occurs, to grant an authenticated user account access to resources located on other system resources, such as the resources of operations center system 104, and without the mobile user manually authenticating with the other systems.

In an embodiment, communication between mobile devices 106, mobile device server 108, and resources in operations center system 104 may be secured using a cryptographic communication protocol such as, for example, the Secure Sockets Layer (SSL) protocol. For example, each of mobile devices 106 may be configured for secure communications by installing a public key security certificate on the mobile devices and a corresponding private key security certificate on mobile device server 108 and resources of operations center system 104. Mobile device security logic 212 may comprise instructions configured to send and receive encrypted network traffic based on the installed security certificates, whereby the mobile device security logic 212 encodes outgoing data with the public key security certificate, and mobile devices server 108 and/or resources of operations center system 104 decode received data with the installed private key security certificates.

In an embodiment, mobile device security logic 212 may comprise program instructions configured to restrict mobile device access to mobile device server 108 based on a whitelist of authorized mobile devices. A mobile device whitelist may be configured by a mobile data analysis system administrator and may include, for example, one or more entries that specify a unique identifier associated with approved mobile devices. The unique identifier may be, for example, a device serial number, an international mobile equipment identity (IMEI) number, a MAC address, or any other identifier that may be transmitted by a mobile device 106 to mobile device server 108. In an embodiment, mobile device security logic 212 may be configured to cause mobile device server 108 to ignore requests that are sent from a mobile device that does not supply an identifier on the whitelist. A mobile device whitelist may be stored in a database, a spreadsheet, or any other suitable format for storage in a data repository such as data repository 110.

In an embodiment, mobile device server 108 comprises repository access logic 214. Repository access logic 214 may comprise a set of instructions which, when executed by one or more processors, are operable to access and retrieve data from data repository 110. For example, repository access logic may be a database client or an Open Database Connectivity (ODBC) client that supports calls to a database server that manages data repository 110.

In an embodiment, data repository 110 generally represents any data storage device (e.g., local memory on mobile device server 108, shared memory, a database, etc.) known in the art which may be configured to store data. In an embodiment, data repository 110 may store, for example, configuration files, security information, and other data associated with mobile devices 106. In some embodiments, data stored in data repository 110 may be accessed by mobile device server 108 in order to avoid sending requests for the same information to resources of operations center system 104.

3.2 Operations Center System Architecture

Figure 3:
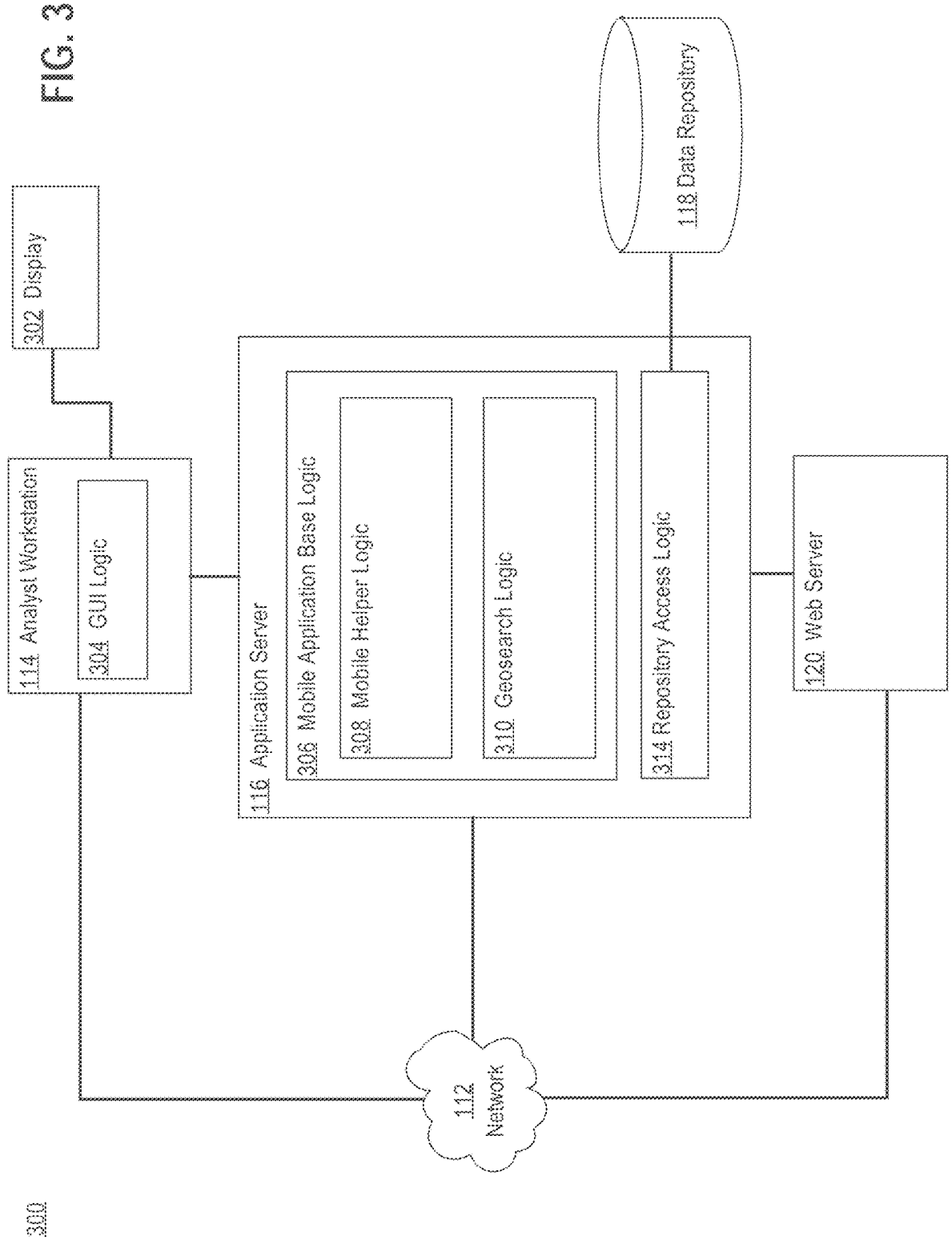
FIG. 3 illustrates an example operations center system in accordance with an embodiment.

FIG. 3 illustrates an example operations center architecture 300. In an embodiment, operations center architecture 300 comprises application server 116, web server 120, and one or more analyst workstations, such as analyst workstation 114.

In the embodiment illustrated in FIG. 3, analyst workstation 114, which may be implemented by one or more physical computing devices, is communicatively connected to application server 116 and web server 120, which may be implemented by one or more other physical computing devices, over a network. In some embodiments, each such physical computing device may be implemented as a separate computer system. For example, analyst workstation 114 may be implemented in a computer system as a set of program instructions recorded on a machine-readable storage medium, while application server 116 and web server 120 may be implemented in different computer systems.

Analyst workstation 114 comprises graphical user interface (GUI) logic 304. GUI logic 304 may be a set of program instructions which, when executed by one or more processors of the computer system, are operable to receive user input and display a graphical representation of one or more graphic constructs related to the mobile data analysis approaches described herein. GUI logic 304 may be operable to receive user input from, and display the graphic constructs to, a graphical user interface that is provided on display 302 by the computer system on which analyst workstation 114 executes.

Analyst workstation 114 may also interact with application server 116 to provide input, definition, editing instructions, and expressions related to a mobile data analysis system as described herein using a programmatic interface, and then the application server 116 may use, process, log, store, or otherwise interact with the received input according to application server logic.

In an embodiment, web server 120 is configured to provide one or more web-based interfaces to resources available from application server 116 and data repository 118. As an example, one or more of mobile devices 106 may comprise a browser that can access HTML documents that web server 120 generates. The web pages may include information about data stored in data repository 118. In other embodiments, web server 120 may use formats other than HTML for transmitting information to requesting devices.

In an embodiment, application server 116 may be implemented as a special-purpose computer system having the logical elements shown in FIG. 3. In an embodiment, the logical elements may comprise program instructions recorded on one or more machine-readable storage media. Alternatively, the logical elements may be implemented in hardware, firmware, or a combination.

When executed by one or more processors of the computer system, logic in application server 116 is operable to perform mobile data analysis system operations according to the techniques described herein. In one embodiment, logic in application server 116 may be implemented in a Java Virtual Machine (JVM) that is executing in a distributed or non-distributed computer system. In other embodiments, logic in application server 116 may be implemented as a combination of programming instructions written in any programming language (e.g., C++ or Visual Basic) and hardware components (e.g., memory, CPU time) that have been allocated for executing the program instructions.

In an embodiment, application server 116 comprises repository access logic 314. Repository access logic 314 may comprise a set of instructions which, when executed by one or more processors, are operable to access and retrieve data from data repository 118.

In an embodiment, data repository 118 may be a type of structured storage for storing data including, but not limited to, relational or object-oriented databases, data warehouses, directories, data files, and any other structured data storage. In one embodiment, data repository 118 is implemented as a revisioning database system configured to track changes made to data stored in the data repository. In an embodiment, a revisioning database system records metadata about changes to stored data, facilitates UNDO and REDO operations of data changes, can receive requests to subscribe to particular data and publish updates to such data for delivery to subscribers, and perform other functions.

In an embodiment, data stored in data repository 118 is conceptually structured according to an object-centric data model, the data model consisting of a collection of data objects. For example, a data object in the data model may represent an entity such as a person, a place, an organization, an event, a document, or a digital media item such as audio or video. A data object may have a type (e.g., Person, Event, Organization) and include any number of data property fields and corresponding data property values. For example, Event data objects may have data property fields for storing information associated with a particular events represented by the data objects such as, for example, a date and time of an event, a location of an event, etc.

In one embodiment, data objects in the data model may be represented as a data object graph consisting of nodes and edges. The nodes of the graph may represent data objects and the edges may represent relationships or other links between data objects. For example, a particular person, represented by a Person data object, may be known to have an affiliation with a particular organization, represented by an Organization data object. The relationship between the person and the organization may be represented by an edge in the data object graph between the Person data object and the Organization data object. An edge between two data object nodes may be represented and stored in various embodiments as a data object property value of one or more of the connected nodes, or as a separate data entity.

In an embodiment, application server 116 comprises mobile application base logic 306. Mobile application base logic 306 generally includes logic implementing mobile data analysis system operations that may be requested by an analyst workstation 114 and mobile devices 106 and comprises mobile helper logic 308 and geosearch logic 310.

In an embodiment, mobile helper logic 308 provides processes for assisting users to observe the location of one or more mobile devices on a map display. Mobile helper logic 308 may comprise program instructions operable to receive and store locational and other data sent from mobile devices and to provide locational and other data in response to requests. The data received, stored, and sent may further include metadata. Mobile helper logic 308 may further comprise logic operable to transmit messages sent from mobile device and analyst workstation users, perform data object searches, and other functionality described herein.

In an embodiment, geosearch logic 310 provides processes for handling geosearch requests sent from a mobile device and analyst workstation users. In general, a geosearch request is a search request for data objects or other information that is associated with one or more specified geographic locations or areas. Examples of processing geosearch requests are described in a separate section herein.

3.3 Configuring Mobile Device Teams

For the purposes of clearly illustrating how the functions described herein operate, the following sections describe example graphical user interface displays for the described mobile data analysis system features. However, the graphical user interface displays described herein represent only selected examples of visualizations for the mobile data analysis system operations that are described herein. Thus, the disclosure broadly encompasses any methods of operating a mobile analysis system that are described herein.

Further, no particular graphical user interface is required and the disclosure is intended to encompass processing approaches for a mobile analysis system that are described independent of any graphical user interface, and it is not intended to be limited to any particular graphical user interface or other form of display. For example, the example graphical user interfaces merely represent one way for an analyst workstation user to view the location of one or more mobile devices on a map, to send and receive messages on a mobile device, and to view images received from a mobile device at an analyst workstation; in other embodiments, programmatic methods may be used to obtain the same information and other forms of data output may be used such as logging, reporting, storing in database tables, storing in spreadsheets, etc.

In an embodiment, mobile device user accounts of a mobile data analysis system may be grouped into one or more mobile device teams. In this context, mobile device user accounts may comprise information associated with a particular user in the mobile data analysis system including, for example, a user name, passwords, and other user settings, and enable users to authenticate with the mobile data analysis system. For example, a field analyst may provide an assigned user name and password at a mobile device in order to be granted access to use the resources of the mobile data analysis system from the mobile device. A mobile device team is a logical grouping of one or more mobile device accounts, and by extension the mobile device users associated with the mobile device user accounts. A mobile device team may be based on organizational, operational, or any other characteristics that define one or more groupings of users within an organization. For example, a law enforcement agency may group mobile device user accounts that have been created for police officers in the agency into one or more mobile device teams based on geographic areas of responsibility, organization roles (e.g., special weapons and tactics, bomb squad, K-9 unit, etc.), security access levels, or other such groupings.

Figure 4:
FIG. 4 illustrates a process flow for generating one or more mobile device teams and mobile device team visibility settings.

In an embodiment, mobile device teams may be associated with one or more visibility settings. Visibility settings for a particular mobile device team may control which other users are able to view information associated with the particular mobile device team including associated location data, messages, and other team-centric information. FIG. 4 illustrates an example process flow 400 for generating one or more mobile device teams and mobile device team visibility settings. In an embodiment, one or more of the steps below may be omitted, repeated, or performed in a different order. The specific arrangement shown in FIG. 4 is not required.

In Step 402, one or more mobile device user accounts are generated. For example, a separate mobile device user account may be generated for each field analyst in an organization using an approved mobile device in the mobile data analysis system. In an embodiment, an input mechanism is provided for a system administrator or other user to enter commands for the purposes of generating mobile device user accounts. Here, the term "input mechanism" includes either a command line interaction mechanism or a graphical user interface based interaction mechanism, or a combination of the preceding two. For example, a command may be issued by a user at an analyst work station 114 and received by application server 116 and, in response, application server 116 may generate and store the one or more mobile device user accounts in a repository, such as data repository 118. In another embodiment, mobile device user account information for one or more mobile device user accounts may be received by an application server in the form of an account configuration file, for example, in an XML, file or other structured document format.

In Step 404, a first mobile device team and a second mobile device team are generated. For example, an authorized user using an analyst workstation may issue one or more additional commands to create two new mobile device teams. The user may associate a label for each of the new teams, for example, the first mobile device team may be labeled the "Green" team and the second mobile device team may be labeled the "Blue" team. The mobile device team labels may be used for the purposes of identifying a mobile device team in other graphical user interfaces of the mobile device system. For the purposes of illustrating a clear example, only two mobile device teams are generated; however, in other embodiments any number of mobile device teams may be generated.

In Step 406, one or more of the mobile device user accounts are assigned to the first mobile device team and one or more of the mobile device user accounts are assigned to the second mobile device team. For example, a user may issue a command that specifies one or more of the generated mobile device user accounts and a mobile device team, the command indicating that the specified mobile device user accounts are to be assigned to the specified mobile device team. In an embodiment, a particular mobile device user account may be assigned to any number of different mobile device teams. The mobile device user account information and mobile device team information may be stored in one or more configuration files, database tables, or in any other suitable format in a data repository, such as data repository 118.

In Step 408, one or more mobile device team visibility settings are received. In this context, mobile device team visibility settings comprise one or more configuration settings indicating whether mobile device user accounts of particular mobile device teams are permitted access to view information associated with mobile device user accounts of other mobile device teams. For example, visibility settings may be used to manage a mobile device user's ability to view other mobile device user accounts and associated locational data on map displays, to send messages to other mobile device user accounts, and access other data associated with other mobile device user accounts. As used herein, indicating that first mobile device team is visible to a second mobile device team means that mobile device users of the second mobile device team are permitted to access and view information associated with mobile device user accounts of the first mobile device team.

In an embodiment, mobile device team visibility settings may be received by an application server as commands input by a user. Using the example mobile device teams Green and Blue generated above, a user may issue a first command that specifies that the Blue mobile team is visible to the Green mobile device team. The user may issue a second command that specifies that the Green mobile device team is not visible to the Blue mobile device team. As a result, mobile device user accounts associated with the Green mobile device team may be able to access and view information about mobile device user accounts associated with the Blue mobile device team. In contrast, mobile device user accounts associated with the Blue mobile device team may be prevented from viewing information associated with the Green mobile device team. In an embodiment, mobile device team visibility settings may also be configured on an individual mobile device user account basis. For example, a user may issue a command indicating that a particular mobile device team is or is not visible to a particular mobile device user account.

In Step 410, mobile device team visibility settings are stored in association with the first mobile device team and the second mobile device team, for example, in data repository 118.

3.4 Mobile Device Tracking

In one embodiment, a mobile data analysis system is configured to track the location and movement of one or more mobile devices and, by extension, the mobile device users using the tracked mobile devices. Tracking the location of mobile devices may be of interest to both mobile device users (e.g., field analysts) using the tracked mobile devices, and to analyst workstation users (e.g., operations analysts) that may be coordinating the activities of the mobile device users. As such, logic in both mobile devices 106 and analyst workstations 114 may be configured to receive and display location data associated with one or more tracked mobile devices.

Figure 5:
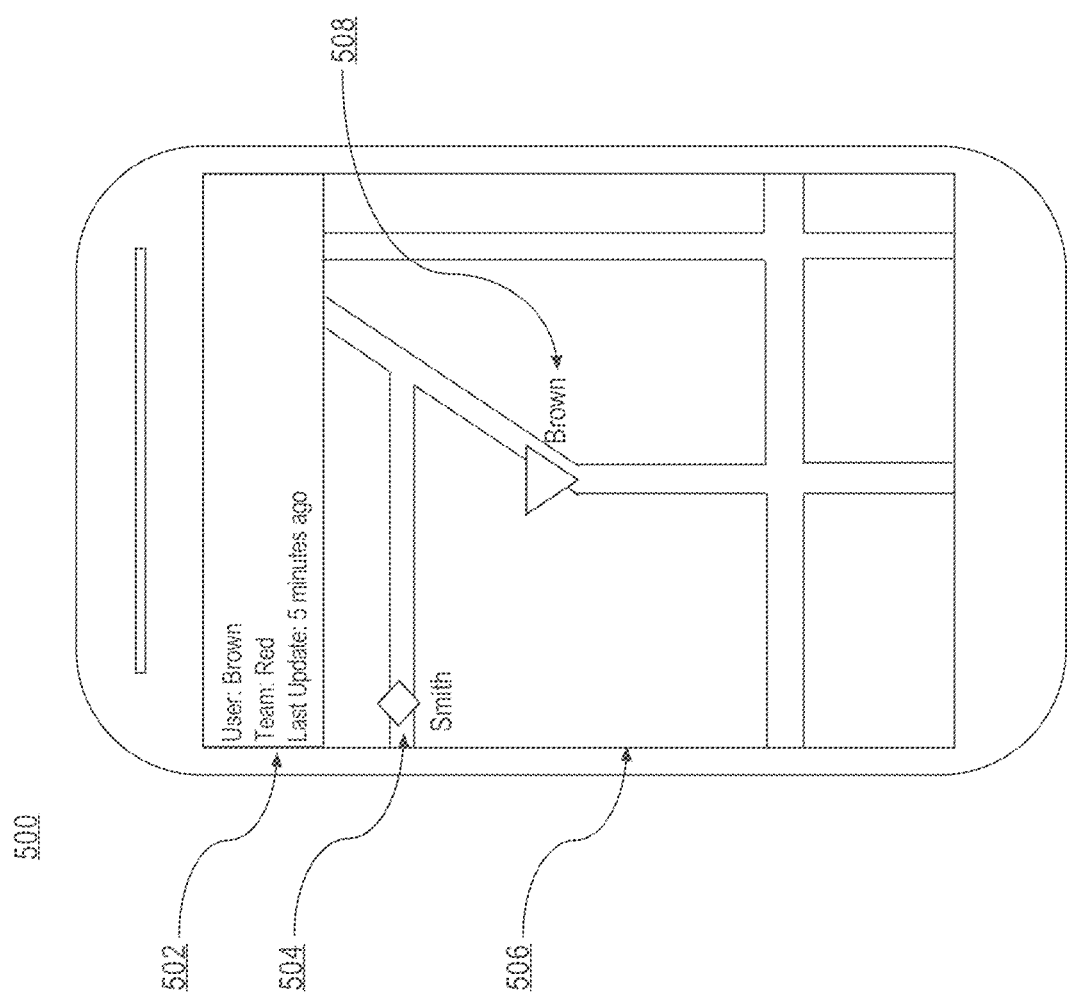
FIG. 5 illustrates an example graphical user interface of a mobile device that is configured to display a location of one or more mobile devices.

FIG. 5 illustrates an example graphical user interface of a mobile device that is configured to display a location of one or more mobile devices. In an embodiment, GUI 500 comprises a mobile device user information panel 502 and a map display 506.

In an embodiment, map display 506 displays a portion of an interactive map including user location icons 504, 508. User location icons 504, 508 indicate an approximate location of two tracked mobile devices associated with mobile device user account indicated by the labels Brown and Smith. Although the example map display 506 displays two user location icons, map display 506 may display any number of mobile device user icons depending on the user's visibility settings, and the number of tracked mobile devices present in the displayed map area at the current map zoom level.

In an embodiment, information panel 502 comprises information related to a mobile device user account associated with a currently selected mobile device in map display 506. In the current example, information panel 502 displays information associated with a mobile device user "Brown." The information about mobile device user Brown may be displayed, for instance, in response to a user indicating input selecting user location icon 508 on map display 506 representing mobile device user Brown, selecting the mobile device user's name from a list, typing the mobile device user name into a search box, inputting a voice command, or otherwise indicating a selection of the mobile device user Brown. For example, a different mobile device and mobile device user account may be selected by indicating input selecting another user location icon that is visible on map display 506, such as user location icon 504 representing mobile device user Smith.

Information panel 502 includes additional information about mobile device user Brown, including "last update" information indicating that mobile device user Brown is assigned to a mobile device team identified by the team name "Red." Information panel 502 further provides information indicating how recently location data was received by a mobile device server from the mobile device associated with mobile device user Brown. In this manner, the last update information may provide an indication of the accuracy of the displayed location for a selected mobile device.

In an embodiment, visibility setting information may determine which mobile device teams and mobile device users a particular user is able to view in GUI 500. For example, a user may be using a mobile device and logged in with a particular mobile device user account. The mobile device may send a request for location data of other mobile devices to mobile device server 108 or application server 116 in order to display the location data on map display 506. In response to receiving a request for location data of other mobile devices from the mobile device, mobile device server 108 and/or application server 116 may determine a set of mobile device teams and mobile device users accounts that the requesting mobile device user account has access to view based on mobile device user account visibility settings stored in data repository 118. Mobile device server 108 and/or application server 116 may send back location data for those mobile device teams and mobile device user accounts for which the visibility settings permit access. In this manner, map display 506 may display a user location icon for those mobile devices for which a user has visibility access, and not for those mobile devices for which visibility access has not been granted.

Figure 6:
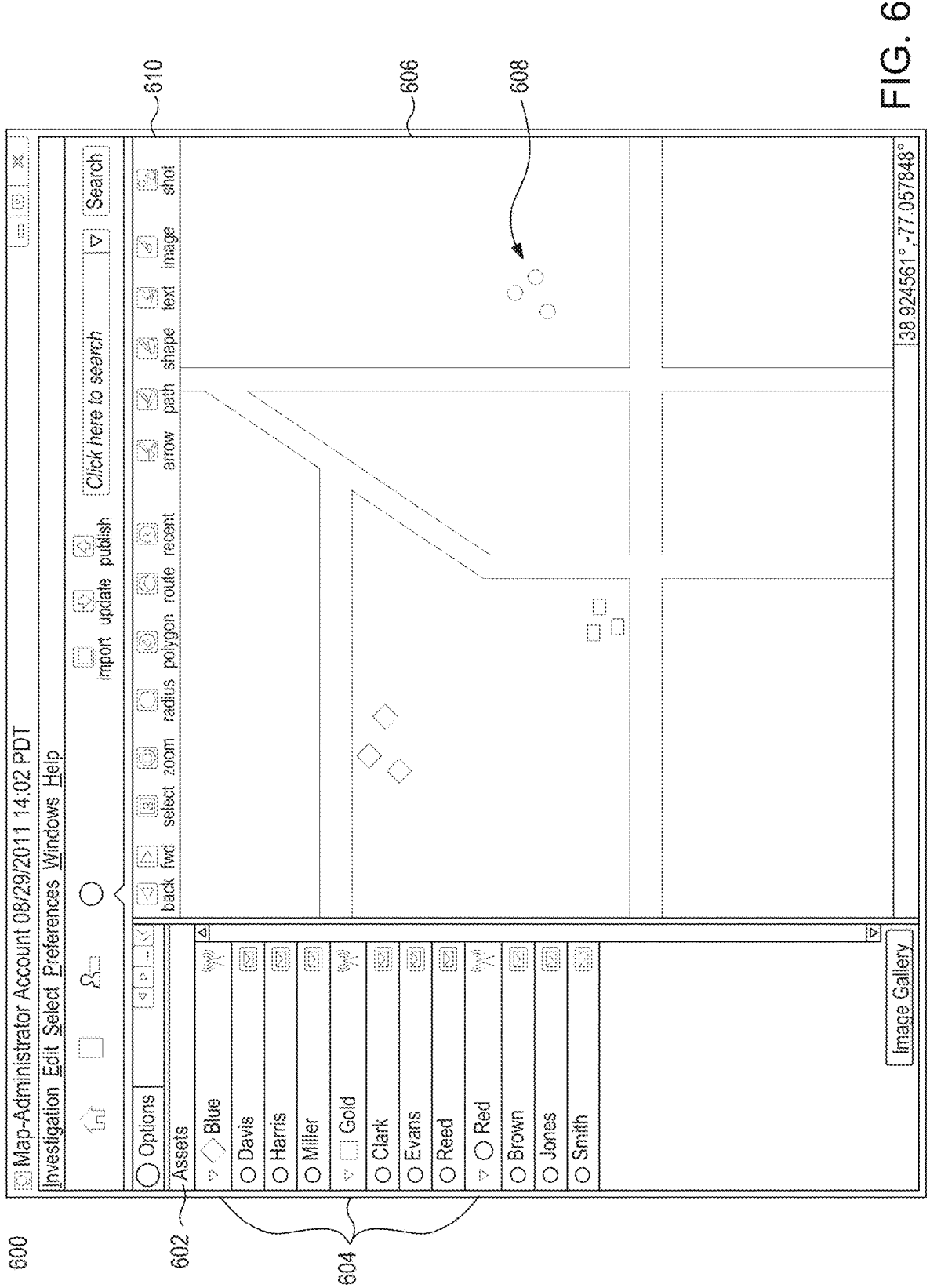
FIG. 6 illustrates an example graphical user interface of an analyst workstation that is configured to display a location of one or more mobile devices.

FIG. 6 illustrates an example graphical user interface of an analyst workstation that is configured to display a location of one or more mobile devices. GUI 600 comprises an assets list 602, mobile device team user lists 604, map display 606, and interface components 610. In an embodiment, GUI 600 generally is configured to display a location associated with one or more mobile device users on a map and the movement of those mobile device users. For example, as a particular mobile device user changes locations, the user's mobile device periodically sends updated location data of the mobile device to a mobile device server and/or application server. The mobile device server and/or application server may then send the updated location data to one or more mobile devices tracking the location of the particular user's mobile device. A map display 606 of the one of the mobile devices receiving the updated location data may be updated based on the received location data. For example, an icon may be displayed on the map for the particular user at an approximate location based on geographic coordinates or other location information included in the received location data.

In an embodiment, assets list 602 displays a list of mobile device teams and mobile device users that the user may view on map display 606. Each of the mobile device team user lists 604 in assets list 602 is configured to display the mobile device user accounts associated with the mobile device team. In an embodiment, the mobile device team user lists 604 shown in assets list 602 may be based on visibility settings stored in data repository 118. Assets list 602 may provide interface elements that enable a user to selectively hide or show particular mobile device teams on the map depending on the user's preferences.

In an embodiment, map display 606 displays one or more user location icons, such as user location icons 608, at a location most recently reported by the associated mobile devices. In the current example, user location icons 608 may correspond to the last known location of the mobile devices associated with the Red mobile device team, as indicated by the matching circle icons in assets list 602 and map display 606. In an embodiment, map display 606 may display information related to an estimated accuracy of the display location data associated with each tracked mobile device user. For example, if a particular mobile device fails to report location data within a specified period of time, an icon of the associated with mobile device user may change in assets list 602 and map display 606, for example, turning from green to yellow to red, and may further provide information indicating the lag time.

In an embodiment, map display 606 may be configured to select an appropriate map centering location and zoom level based on the mobile teams the user has visibility access to and/or teams currently selected from assets list 602. For example, map display 606 may display a map area that is large enough so that each of the selected mobile device team users in assets list 602 is displayed in the map area. An appropriate map zoom level may be determined, for example, by analyzing the location data (e.g., geographic coordinates) to determine a location associated with each of the mobile device user accounts to be displayed and selecting a map centering location and zoom level that includes each of the associated locations. For example, if a first mobile device team includes mobile device user accounts that are located in California, and a second mobile device team includes mobile device user accounts in New York, map display 606 may center on a location between California and New York and display a zoom level that is large enough to simultaneously display the mobile device users in both California and New York.

In FIG. 6, for example, the map currently is zoomed to display an area that includes user location icons for each of the mobile device teams and mobile device user accounts listed in asset list 602. If one or more of the currently displayed user accounts moves to an area that is outside of the currently displayed map view, a mobile device generating map display 606 may be configured to re-center or adjust the zoom level so as to maintain a display view of all selected mobile device teams. As another example, if a user selects one or more additional mobile device teams for viewing in assets list 602, or indicates input hiding one or more of the mobile device teams in assets list 602, map display 606 may be configured to re-center or adjust the zoom level so as to display all selected mobile device teams.

Interface components 610 may enable a user to adjust the current view of map display 606, for example, by zooming in or out, panning, annotating the display, or selecting particular mobile device users or teams to track.

3.5 Mobile Device Messaging

Figure 7:
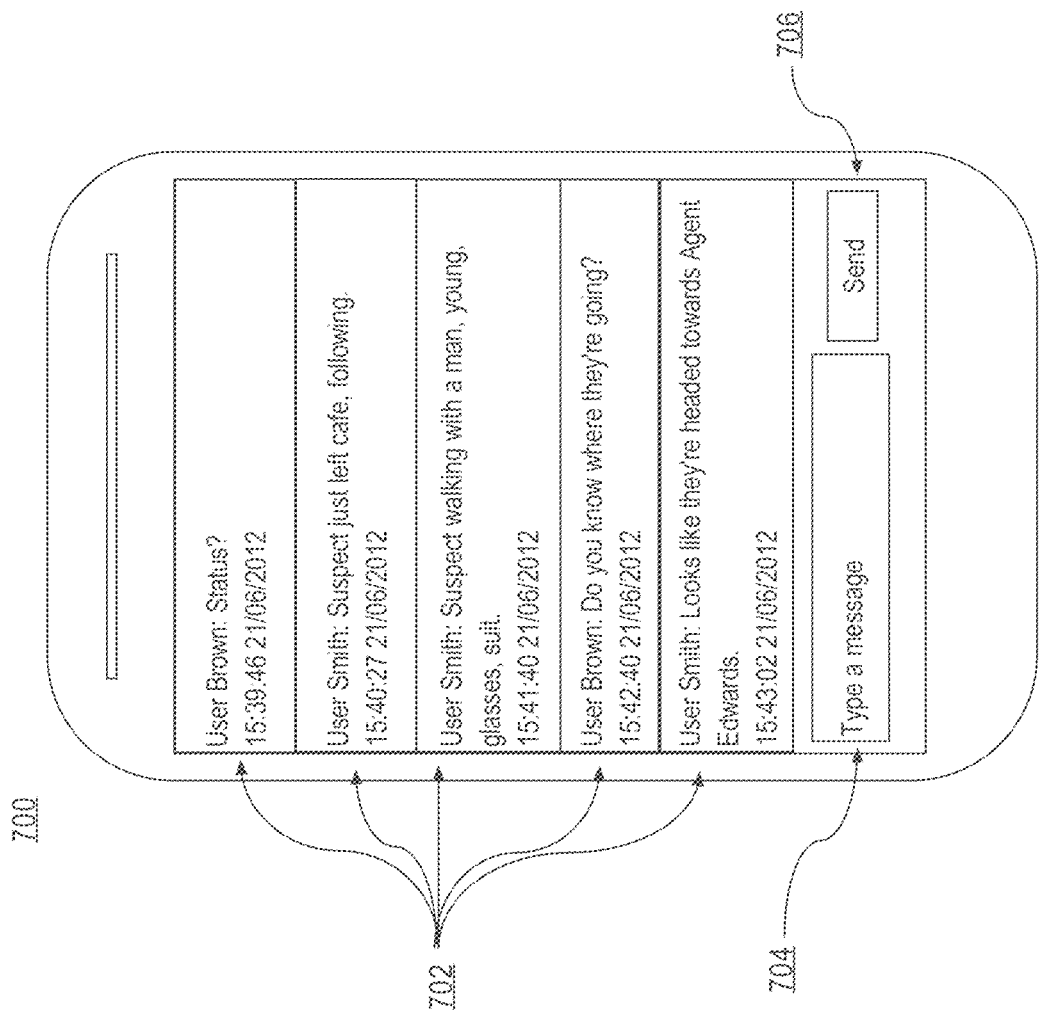
FIG. 7 illustrates an example graphical user interface of a mobile device that is configured to enable messaging between field analysts and between field analysts and operations analysts.

In an embodiment, mobile devices and analyst workstations of the mobile data analysis system may include logic operable to enable field analysts and operations analysts to exchange messages. In general, a message in the mobile data analysis system may comprise, without limitation, any combination of text, images, video, hyperlinks and other markup, other messages, and data objects. FIG. 7 illustrates a GUI 700 of a mobile device that is configured to enable messaging.

GUI 700 comprises messages 702, message input box 704, and message send button 706. In an embodiment, messages 702 provide a transcript of messages that a user of the mobile device has previously sent and received. Each of messages 702 may include information such as, for example, the message content, the name of the user that generated the message, and a timestamp indicating when the message was sent or received. In the current example, messages 702 depict a text conversation between mobile device user accounts labeled as Brown and Smith. In various embodiments, user names and user messages displayed in GUI 700 may include additional information related to the users including. For example, a displayed user name may provide an indication of whether the user is messaging from another mobile device or from an analyst workstation, or different user icons may be displayed based on whether a user is a mobile user or an analyst workstation user.

In an embodiment, to send a new message, a user may input message content into message input box 704. A user may input information into message input box 704 including text, multimedia content, and data objects stored on a data repository, or new multimedia content generated by the user using, for example, a camera 210 or voice input.

In an embodiment, selection of the send button 706 may cause message content from message input box 704 to be sent to one or more mobile devices, broadcast to one or more mobile device teams, and/or sent to one or more analyst workstations.

Figure 8B:
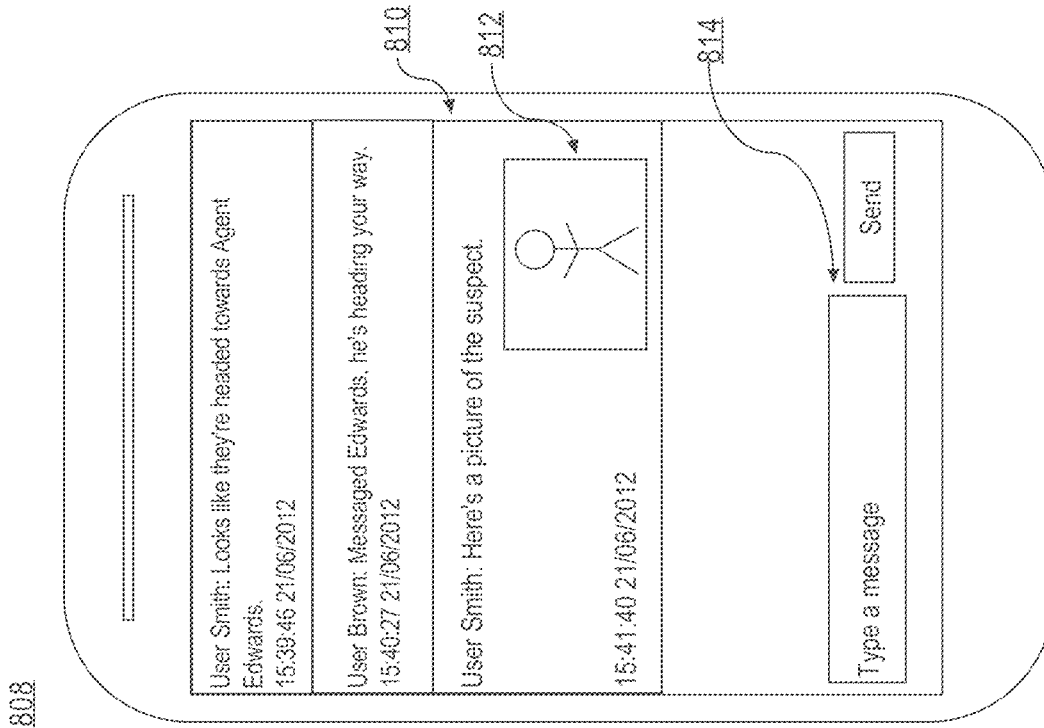
FIG. 8A, FIG. 8B illustrate example graphical user interfaces of a mobile device that are configured to enable a user to capture multimedia content on a mobile device and to send and receive multimedia content in messages.
Figure 8A:
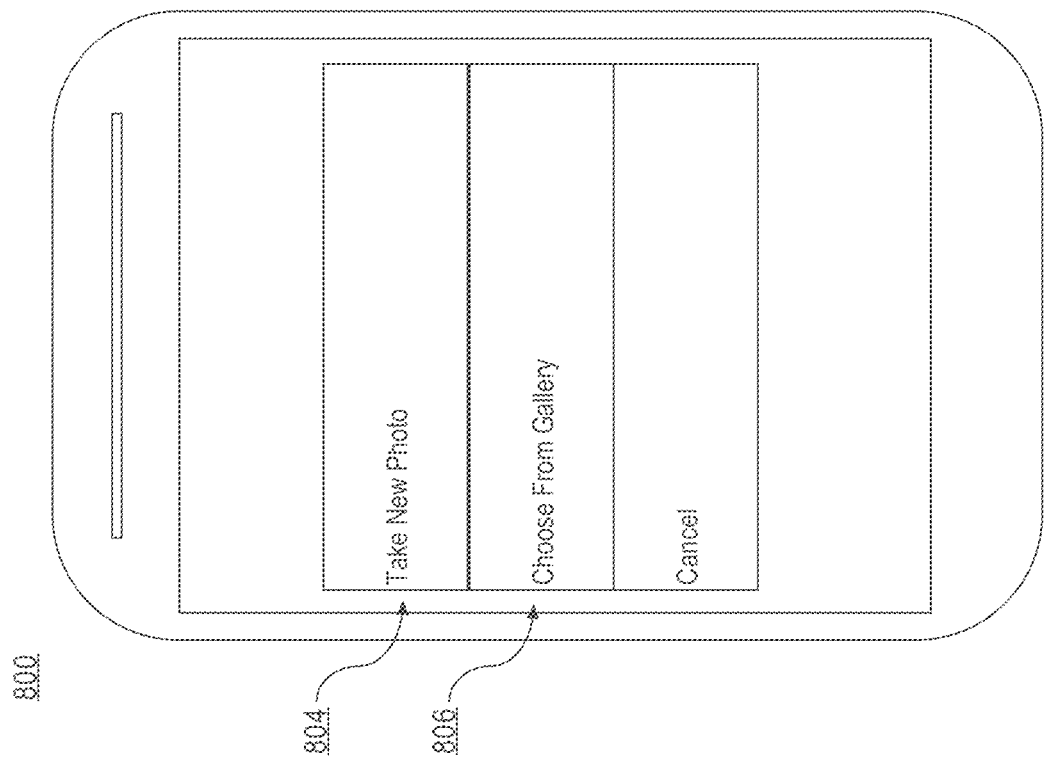

FIG. 8A, FIG. 8B illustrate GUIs 800, 802 that may be implemented on a mobile device for sending multimedia content, such as a digital image, in a message, according to an embodiment. GUI 800 comprises new photo button 804 and image gallery button 806.

A user may select new photo button 804, for example, in order to capture a new digital image using the mobile device using a camera 210. In another embodiment, a mobile device user may select one or more images previously captured and stored on the mobile device by selecting image gallery button 806. Once image gallery button 806 has been selected, for example, a user may be prompted to select one or more digital images stored on the mobile device. The image may also be selected from a data object stored on the data repository.

GUI 808 illustrates a graphical user interface configured to enable a user to send and receive messages including a digital image. GUI 808 includes, for example, a message 810 sent by user Smith. In the example, message 810 comprises a digital image 812 that may have been previously captured by user Smith and attached to message 810. For example, a user may attach a digital image, possibly associated with a data object, to a message using text input box 814 or any other input mechanisms.

3.6 Creating Data Objects from Images

In an embodiment, an operations analyst or other user may desire to create a data object from a digital image captured by a field analyst or other user using a mobile device. FIG. 9 illustrates an example process flow 900 for creating data objects from one or more digital images. In an embodiment, one or more of the steps below may be omitted, repeated, or performed in a different order. The specific arrangement shown in FIG. 9 is not required.

In Step 902, a computing device receives a digital image comprising image metadata. For example, the computing device may be an analyst workstation and the digital image may be sent to the analyst workstation from a mobile device via a network, such as network 112. The digital image may be sent from a mobile device to an analyst workstation as part of a message, attached to an email, as a direct upload, or using any other mechanism of transmitting a digital image. For example, a field analyst using a mobile device may capture an image of a person of interest or a particular location and send the captured image to an analyst workstation in a multimedia message, as described above. In other embodiments, the digital image may be received by querying a stored collection of digital images in a data repository, such as data repository 118.

In an embodiment, a digital image received by the computing device comprises image metadata. The image metadata generally may comprise information about the digital image and include one or more image properties each having an image property value. For example, the image properties may include, without limitation, date and time information, location information, camera manufacturer and camera model number, compression format, camera settings (e.g., exposure time, f-number, etc.), image thumbnails, and mobile device user information. The image metadata may be generated by a camera or mobile device when the digital image is captured and may be stored, for example, as part of a file representing the digital image or stored in a separate metadata file. In one embodiment, the image metadata may comprise data conforming to the exchangeable image file format (EXIF) standard.

In Step 904, the computing device transforms one or more of the image property values of the one or more image properties into one or more particular values. In an embodiment, transforming the one or more image property values may include, for example, reading the image metadata and extracting one or more image property values from the image metadata. Transforming may further comprise reformatting, converting units, combining values, or any other data transformations to one or more of the image property values. For example, transforming may include converting values representing a date and time in one format into another format suitable for storage in a data object of the mobile data analysis system.

In Step 906, one or more data object property values of a data object are populated with the one or more particular values. In an embodiment, the data object may represent a newly generated data object, or a data object already existing in the mobile data analysis system. Populating the one or more data object property values generally may include assigning the transformed particular values to corresponding data object property fields. For example, a particular data object property field may store a value indicating a geographical location and the particular data object property field may be assigned a value obtained from the image metadata indicating a geographical location where the digital image was captured.

In an embodiment, the populated data object may be associated with a particular data object type. For example, default settings may associate the data object with an Event data object type. Depending on the data object type, particular data object property fields may or may not be associated with the data object. For example, a data object of type Event may have a property field indicating an event time, whereas a data object of type Person may not. In an embodiment, a user may change the default data object type and/or modify the data object type currently associated with a particular data object. For example, a data object of type Event may be created from a digital image of an individual, and a user may desire that the data object be changed to a Person type. The user may specify input modifying the data object type to type Person, for example, using one or more graphical user interfaces described herein. Data objects created generally may be associated with any data object types defined in the mobile data analysis system and may include, for example, an event type, a person type, an organization type, a location type, an entity type, and an item type.

In an embodiment, creating a data object from a digital image may further comprise generating one or more links to one or more other existing data objects of a data object graph stored in a data repository, such as data repository 118. For example, using the steps described above in FIG. 9, a data object of type Person may be created from an image depicting an individual known to be affiliated with a particular organization. The particular organization may, for example, be represented by an Organization data object as part of a data object graph stored in data repository 118. An operations analyst or other user may desire to associate the created Person data object with the existing Organization data object in the data object graph. Accordingly, the user may specify input indicating an association between the two data objects, and as a result one or more links may be generated from the Person data object to the Organization data object and the links may be stored in the data repository. For example, the links may be stored as one or more data object property fields of the Person data object and/or Organization data object, or stored as separate link data entities. In one embodiment, the links between the created data object and other existing data objects may be specified by a mobile device user. For example, the mobile device user may specify the links as part of a message that includes the digital image from which the data object is created.

In one embodiment, a data object may be created from two or more digital images. For example, an analyst workstation may receive multiple images from one or more mobile devices that depict the same individual. An operations analyst using the analyst workstation may desire to create a single data object based on the multiple images. In an embodiment, transforming one or more image property values into one or more particular values further comprises generating summary information based on image metadata of the two or more digital images. For example, the metadata of each of the two or more digital images may include a property value indicating a location where the digital image was captured. In one embodiment, transforming the metadata image property values into particular values may include generating a particular location value, the particular location value derived from an average of the location values of the metadata for each of the digital images.

In Step 908, the data object is stored in a data repository. For example, the data object may be stored in a data repository such as repository 118 and made accessible to other field analysts and operations analysts using mobile devices 106 and analyst workstations 114 for further data manipulations.

Figure 10:
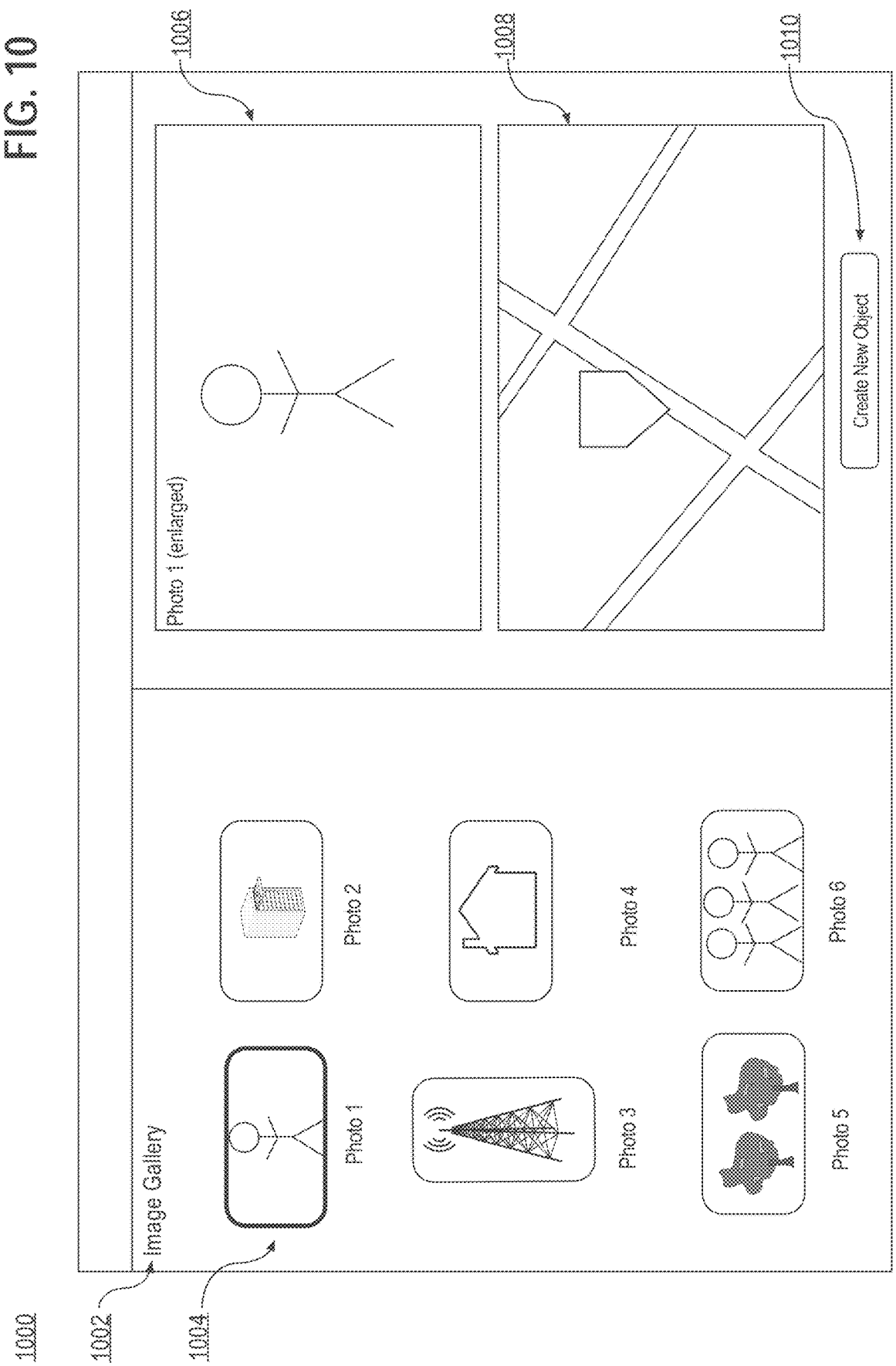
FIG. 10 illustrates an example graphical user interface that is configured to obtain user selection one or more digital images and enable a user to create one or more data objects from the selected digital images.

In some embodiments, creating a data object from a digital image may be performed in response to a user selecting an image for processing, for example, using a GUI 1000 as shown in FIG. 10. GUI 1000 includes an image gallery 1002, a selected image display 1006, a map display 1008, and a data object creation button 1010. For example, GUI 1000 may be used by an operations analyst to view digital images at an analyst workstation that have been received from one or more mobile devices and/or from other sources, and to create data objects from the received digital images.

Image gallery 1002 displays a selection of digital images received by a computing device generating GUI 1000. Digital images displayed in the image gallery 1002 may be filtered and/or sorted to display those images most relevant to a user's interests. For example, GUI 1000 may provide input mechanisms that enable a user to filter the displayed digital images to those uploaded by one or more particular mobile device user accounts or by one or more particular mobile device teams. Digital images displayed in image gallery 1002 may also be sorted by other criteria, for example, by the date and time the digital images were captured, the date and time the images were uploaded, a location associated with the digital images, or any other desirable sorting order.

In an embodiment, a user may select one or more digital images displayed in image gallery 1002 and in response GUI 1000 may provide additional information related to the selected digital images in selected image display 1006 and map display 1008. For example, a digital image selected in image gallery 1002 may be displayed in selected image display 1006 in a larger or higher resolution format. In the present example, Photo 1 from the image gallery 1002 is selected, as indicated by the bolded outline of the image, and an enlarged display of Photo 1 is shown in selected image display 1006.

Map display 1008 includes a map that may display geographic information associated with a selected digital image from image gallery 1002. For example, map display 1008 may that include an icon representing a geographic location where a selected image was captured. For example, a geographic location where one or more selected images were captured may be determined based on information in the associated image metadata for each selected image. If multiple digital images are selected in image gallery 1002, map display 1008 may display multiple icons representing a geographic location associated with each of the selected images. Map display 1008 may be further configured to zoom to an area of the map that includes the location associated with each of the selected images.

In an embodiment, GUI 1000 includes a data object creation button 1010 which, when selected, may cause performance of one or more steps of creating a data object from the currently selected digital images, as described above in further detail with reference to FIG. 9.

Figure 11:
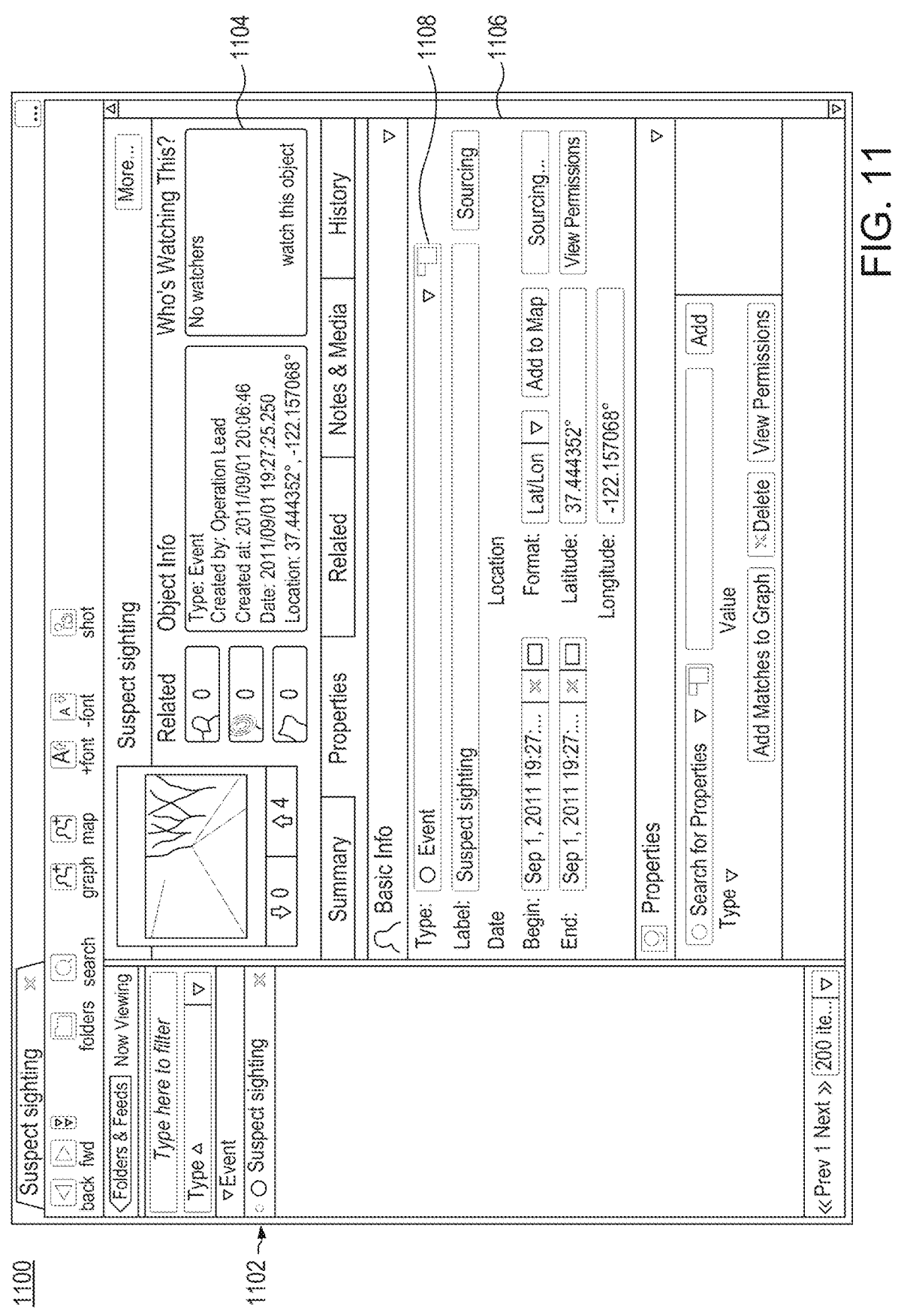

In some embodiments, GUI 1100 of FIG. 11 may be optionally used to modify information or supply additional information related to a data object created from a digital image. FIG. 11 comprises data object list 1102, data object information panel 1104, and data object property interface elements 1106.

Data object list 1102 displays a list of selectable data objects stored in the mobile data analysis system. The data objects listed in data object list 1102 may include, for example, data objects created during a current user session, or data objects previously created by the user and retrieved from a data repository. The data objects displayed in data object list 1102 may be filtered and stored based on object type, a title associated with object, a user associated with the object, or any other criteria.

Data object information panel 1104 includes information associated with a currently selected data object from data object list 1102. As depicted, data object information panel 1104 displays information for an Event data object labeled "Suspect sighting." Information displayed in data object information panel 1104 includes a display of a digital image associated with the selected data object, information about other related data objects, information about a user that created the data object, when the data object was created, and a location associated with the data object.

Interface elements 1106 are selectable to facilitate modification of the property values of a currently selected data object. For example, object type selector 1108 is a pull-down menu that allows a user to select between different object types that are defined in the mobile data analysis system. Users may modify other data object properties using the interface elements including a label of the data object, date and time information, location information, and data object link information. The interface elements 1106 may depend on the data object type for the selected data object and the particular data object property fields associated with the data object type.

3.7 Mobile Device Search

In an embodiment, mobile device users may search for data objects and other information stored in a centralized data repository, such as data repository 118. For example, a field analyst may desire to search for stored data objects to acquire information about the field analyst's current activities. The field analyst may, for example, be interviewing an individual in the field and desire to know if any information previously has been collected about the individual and stored in the data repository. In an embodiment, the field analyst may specify a search request for information about the individual using a mobile device 106 and the mobile device may send the search request to application server 116 via mobile device server 108. In an embodiment, a mobile device user may specify a search request, for example, by inputting one or more search terms or using a voice command.

In response to receiving a search request from a mobile device, application server 116 may retrieve one or more data object results from data repository 118 that are relevant to the search request. For example, application server 116 may locate data objects in data repository 118 that include one or more of the specified search terms. Application server 116 may send the resulting data objects or other information to the requesting mobile device for display on the mobile device.

Figure 12:
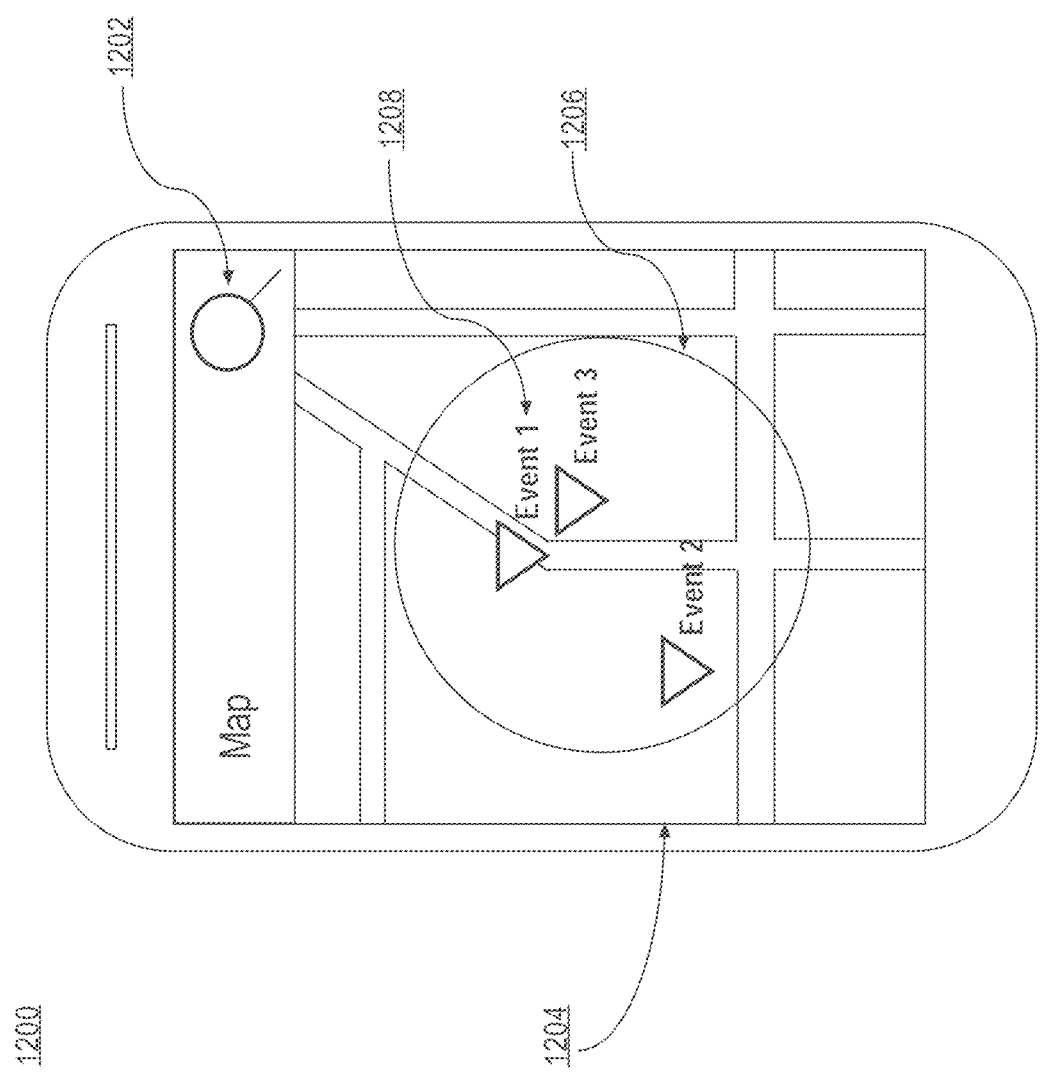
FIG. 12 illustrates an example graphical user interface of a mobile device that is configured to enable a user to submit geosearches.

In one embodiment, mobile device users may specify geosearch requests using a mobile device. In general, a geosearch request is a search request for data objects that are associated with a specified geographic location or area. FIG. 12 illustrates an example GUI 1200 of a mobile device that is configured to enable users to specify a geosearch request.

In an embodiment, GUI 1200 comprises search button 1202 which, when selected, may be configured to enable a user to specify a geosearch request. In one embodiment, mobile device users may specify a geosearch request using map display 1204. For example, a user may specify on map display 1204 a geographic bounding area of interest for the geosearch request. In the current example, bounding area 1206 illustrates an example bounding area for a geosearch request. In the example, the bounding area is depicted as a circle, but other bounding area shapes may be used. The specified geographic bounding area may be used to transmit as part of the geosearch request a set of geographic coordinates or other information that enables application server 116 to determine a geographic area within to search. A geosearch request may include other parameters including a time span desired for result data objects. For example, a user may desire that only Event data objects associated with an event that occurred in the past week be returned.

In response to receiving a geosearch request, application server 116 may determine one or more result data objects in data repository 118 that include location data specifying one or more locations that are within the bounding area specified by the geosearch request. Application server 116 may send the result data objects to the requesting mobile device and the mobile device may display the result data objects on map display 1204. For example, event data object icon 1208 illustrates an example geosearch result data object for a geosearch request specified by bounding area 1206. Event data object icon 1208 may be displayed at a location on the map based on location data stored in association with the data object result corresponding to the displayed icon. In an embodiment, a user may select one or more of the data object result icons on map display 1204 in order to view additional information associated with the data object.

3.8 Mobile Reports

In one embodiment, a mobile device may be configured to enable mobile device users to generate and submit mobile reports. In this context, a mobile report represents information collected by a mobile device user and provided as input to a report form displayed by an associated mobile device. In an embodiment, a mobile report may be based on a report template defining one or more data field types, data object link types, and other property information to be associated with a mobile report generated based on the report template. Report templates representing any number of different types of mobile reports may be created for use by one or more mobile device users depending on particular types of events and associated information that are desired for reporting.

In one embodiment, a report template may be created by a user at an analyst workstation or other remote computer and may be made available to one or more mobile device users. A user may create a report template by specifying one or more data field types, data object link types, and other property information associated with the report template. The defined data field types, data object link types, and other property information may represent information desired for collection in mobile reports generated based on the report template. For example, if a user desires to enable one or more mobile device users to submit mobile reports that specify a person's name and age, the user may create a report template that includes a first data field type for storing a person's name and a second data field type for storing an age value. The report template may further include data object link type information for creating data objects representing a person and creating links from the person data objects to other data objects. The example report template may include other property information to be collected about the report such as a time and/or location where a report based on the report template is created.

In an embodiment, a report template may be stored in a structured data format, such as Extensible Markup Language (XML) or JavaScript Object Notation (JSON). For example, each of the defined data field types, data object link types, and other property information may be stored as elements of the structured data format. A report template stored as structured data or in another format may be sent directly to one or more mobile devices, or sent to another server such as mobile device server 108, that may store and cause a report template to be accessible to one or more mobile devices. A mobile device that has received a report template, either directly from an analyst workstation or from another other server, may store and use the report template for the generation of mobile reports, as further described herein.

FIG. 13 illustrates a process flow for generating mobile reports based on a report template. In Step 1302, a mobile device receives a report template. As described above, the report template may be received, for example, directly from an operations analyst workstation or a data source such as data repository 110 via a mobile device server 108. In response to receiving the report template, a mobile device may store the report template locally on the mobile device for subsequent access and enabling the mobile device to access the report template in the event the mobile device does not have access to a mobile device server 108. In an embodiment, one or more report templates may be received by a mobile device during an initial configuration process of the mobile device.

In Step 1304, a report form is displayed based on the received report template. For example, a request may be received from a user of the mobile device to generate a mobile report based on a report template. The request may be generated, for example, in response to the user selecting the report template from a list of named report templates, typing the name of the particular report template into a search box, or otherwise indicating a selection of the particular report template.

Figure 14B:
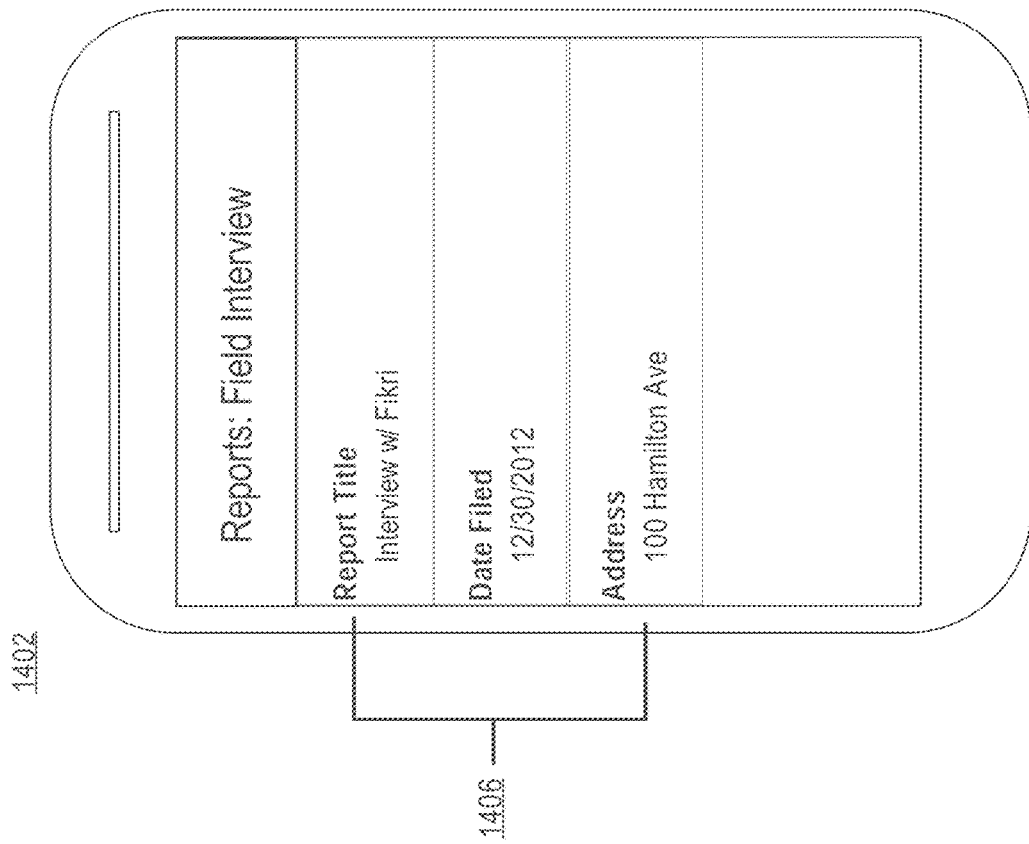
FIG. 14A, FIG. 14B illustrate example graphical user interfaces of a mobile device configured to enable a user to generate a mobile report.
Figure 14A:
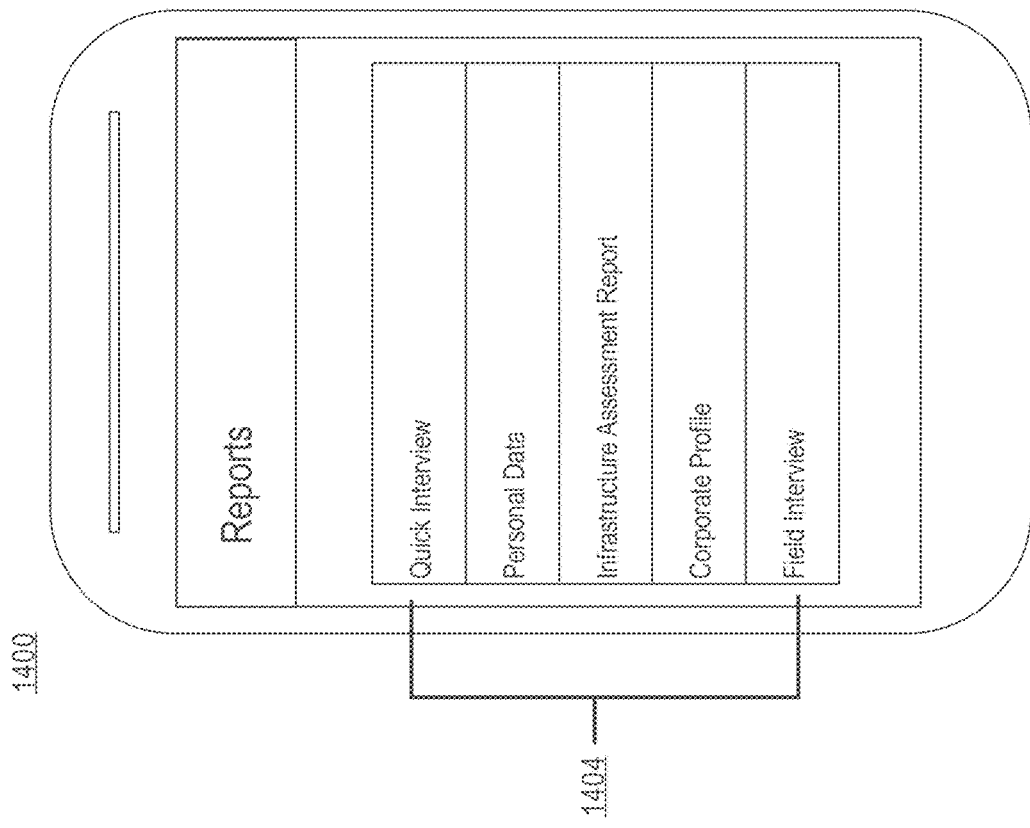

The process of FIG. 13 may be implemented using a graphical user interface of a mobile computing device; for example, FIG. 14A illustrates an example GUI that is configured to enable a user to select a particular report template for the generation of a mobile report. In an embodiment, GUI 1400 comprises a report template list 1404. Report template list 1404 displays several selectable list items, each list item representing a particular report template that the mobile device generating GUI 1400 has received or otherwise may access. Each list item in report template list 1404 may, for example, display a report template title or other information derived from the report template represented by the list item. A user may indicate a selection of a particular report template from report template list 1404 by clicking on, touching, or otherwise providing input selecting the particular list item corresponding to the desired report template.

In response to receiving the request to generate a mobile report based on a particular report template, a report form is displayed. In an embodiment, a report form comprises one or more input fields that enable a user to provide input for a corresponding mobile report. Each input field may comprise one or more interface elements that enable a user to provide input data related to the mobile report. For example, an input field may comprise an interface element such as a text input box, a drop-down list, etc.

In an embodiment, displaying a report form may comprise determining one or more input fields to display based on data field types specified by the selected report template. As an example, a report template created for generating mobile reports collecting information related to field interviews conducted by a police officer may include data field types representing an interview description, a location, and a date. A mobile device displaying a report form based on the example field interview report template may generate one or more input fields for each of the specified data field types and that enable a user to provide input data specifying a description, location, and date for a field interview mobile report.

FIG. 14B illustrates a GUI 1402 that includes an example of a report form displayed based on a report template. The report form illustrated in FIG. 14B is based on an example report template representing a "Field Interview" and provides several input fields 1406 related to information that may be collected by a police officer during a field interview. The report form in GUI 1402 may have been generated, for example, in response to a user selecting the list item entitled "Field Interview" from the report template list 1404 in FIG. 14A.

In an embodiment, GUI 1402 comprises input fields 1406, including an input field corresponding to a data field type representing a "Report Title," a data field type representing a "Date Filed," and a data field type representing an "Address." The input fields 1406 illustrated in GUI 1402 are provided only as an example and a report form may generally include any number and type of input fields depending on the corresponding report template. A user may provide input data associated with one or more of input fields 1406 using any number of input mechanisms including an on-screen keyboard, selecting an item from a drop down list, voice input, etc. In an embodiment, the particular type of interface element provided for a particular data field type may be based on a data type or other characteristic associated with the corresponding data field type in the report template. For example, if a particular data field type is associated with text data, a text box interface element may be displayed for the particular data field type in the report form.

In Step 1306, user input data is received. For example, user input data may be received in response to a user selecting a GUI element to save a report form for which the user has provided input data. In another embodiment, user input data provided in a report form may be received automatically in response to the user providing the input and without the user expressly providing input to save the report form. The received user input data may comprise input data that the user has provided for one or more input fields in the displayed report form.

In one embodiment, user input provided for an input field may be used to generate one or more input suggestions for one or more other input fields. For example, a mobile report form may comprise input fields corresponding to a person's name, a date of birth, and an address. A user may specify a particular name and date of birth in the corresponding input fields and, in response, the user may be presented with one or more suggestions for an address based on the supplied name and date of birth.

In an embodiment, input field suggestions may be provided in response to a user identifying one or more data field types of a report template as "searchable" fields and one or more data field types as "suggestible" fields. In an embodiment, input data provided by a mobile device user in an input field of a report form representing a searchable data field type may be used as a search key to search for data objects in a data repository. For example, a user may provide a particular input data value for an input field representing a person's name and, in response, the particular input data value may be used as part of a search request to a data repository, such as data repositories 110, 118. In response to a search request, a mobile device may receive one or more result data objects and use one or more data values contained in the result data objects to provide input suggestions for one or more of the suggestible data field types. For example, a mobile device may display the one or more input suggestions for a suggestible data field type as a list or other graphical display in response to the user selecting the particular input field representing the suggestible data field type.

In Step 1308, a mobile report is generated based on the provided input data. In an embodiment, generation of a mobile report may comprise storing the input data provided in one or more input fields of the report form in a format that enables the mobile device to send the mobile report to a central resource server, such as application server 116. For example, a mobile report may be stored in a structured data format such as XML, or JSON.

In an embodiment, a generated mobile report may further comprise information indicating one or more relationships, or links, between data objects to be created based on the mobile report. For example, information contained in a mobile report that collects information about an interviewed suspect and a location where the suspect interview occurred may specify a link between generated data objects representing the suspect and the interview location. The link information between the suspect and location may be used to generate a link object representing the relationship between the suspect and the location, and possibly with other existing data objects that have relationships to the suspect or location.

In an embodiment, generated data object links may be based on information specified in the corresponding report template. For example, a particular report template may specify data field types corresponding to information desired for collection about interviewed suspects. The example report template may further specify that an Interview data object and a Suspect data object are to be created based on input data received from a mobile device user, and that a link is to be created between the Suspect data object and the Interview data object. An application server receiving a mobile report based on the example report template generates the specified data objects and data object links for storage in a data repository. The information defining a link between data objects may include other information such as a link type, a label for the link, and a link direction.

In an embodiment, generation of a mobile report may comprise generating one or more metadata values associated with the mobile report. Metadata values may be generated to associate data with a mobile report without a user expressly providing the values in an associated report form. The metadata values to be collected in a mobile report may be specified in the associated report template and configured based on the particular type of mobile report. Examples of metadata values that may be generated for a mobile report include a geographic location where the mobile report was generated, a start time indicating a time when the user initiated generation of the mobile report, and an end time indicating a time when the user completed generation of the mobile report. For example, generation of a mobile report by a mobile device may comprise determining a geographic location associated with the mobile device based on current location data associated with the mobile device. Geographic coordinates or other data representing the current location of the mobile device may be stored as part of the mobile report. Other metadata may be based on timestamps generated by the mobile device.

In Step 1310, a mobile report is sent to a server causing the server to generate one or more data objects and/or data object links. By sending a generated mobile report to a server, a mobile device user generally enables the data collected in the mobile report to be stored and made available to other users of the mobile data analysis system. A mobile device user may send a mobile report by selecting a GUI element on a mobile device indicating that the user has completed data entry for the mobile report and that the mobile report is ready for submission. In response to the user selection, the mobile device may send the data representing the mobile report to a centralized application server, such as application server 116.

In an embodiment, an application server receiving a submitted mobile report may be configured to generate one or more data objects and/or data object links in response to receiving the mobile report. Generating data objects may include populating one or more data object fields of the data objects based on the input data contained in the received mobile report. The one or more generated data objects may be associated with a particular data object type based on information contained in the mobile report. In an embodiment, the particular data objects and associated data object type information for a particular mobile report may be derived from the report template generating the mobile report. For example, two different mobile report templates may specify the same or similar data field types (resulting in similar mobile report forms), but specify mappings of the data field types to data objects of different data object types. In this manner, the creation of data objects of particular data object types may be customized for particular mobile report use cases.

In an embodiment, the application server may further generate one or more data object links between the generated data objects, and possibly with other existing data objects in a repository, such as data repository 118. As described above, each generated link may represent a particular relationship between two or more data objects. In an embodiment, a data object link may be represented as separate data entity or as a property of an associated data object. The generated data objects and data object links may be stored in a data repository 118 and thereby made available to other users of the mobile data analysis system.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
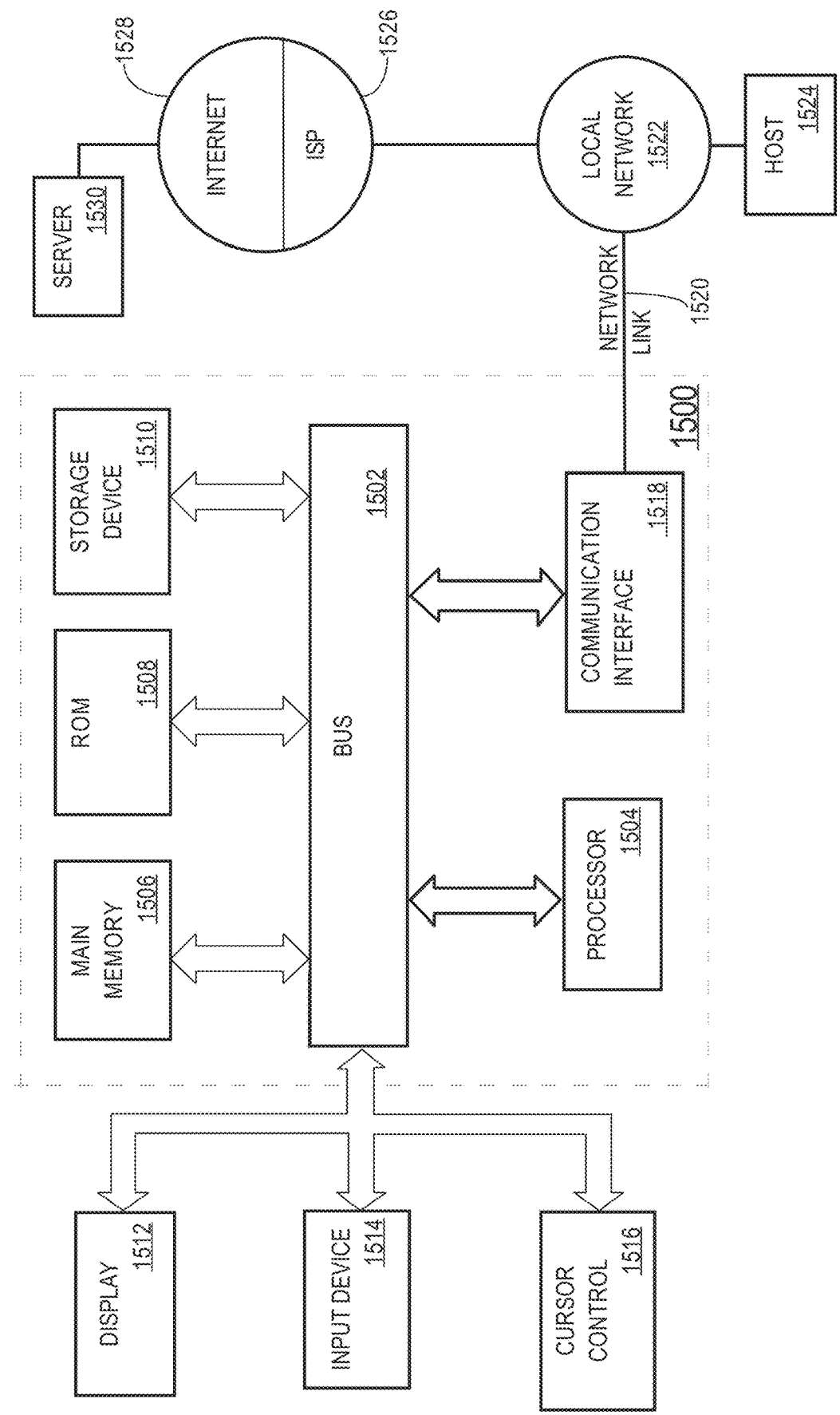
FIG. 15 illustrates a computer system upon which an embodiment may be implemented.

For example, FIG. 15 is a block diagram that illustrates a computer system 1500 upon which an embodiment may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk, optical disk, or solid-state drive is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1510. Volatile media includes dynamic memory, such as main memory 1506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

What is claimed is:

1. A computer-implemented method comprising:
   transforming field data into a plurality of data objects, wherein the field data includes at least one mobile report or mobile report form generated at a first field device;
   wherein each data object of the plurality of data objects includes one or more data fields and corresponding data property values;
   storing the plurality of data objects into a centralized data repository;
   defining a template with a searchable field type and a suggestible field type;
   receiving an input describing a constraint of a digital map from a second field device,
   the constraint coming from a first input field having the searchable field type in a particular mobile report form generated at the second field device from the template;
   identifying one or more particular data objects of the plurality of data objects that satisfy the constraint;
   receiving a selection of a second input field having the suggestive field type in the particular mobile report form;
   causing, in response to the selection, display at the second input field of information regarding the one or more particular data objects as suggestions for the second input field,
   wherein the method is performed by one or more computing devices.

2. The method of claim 1, wherein at least a portion of the plurality of data objects is transformed from the at least one mobile report according to a data object relationship definition specified in a report template from which the at least one mobile report is generated.

3. The method of claim 1, wherein the field data includes at least one digital image generated at a field device, wherein at least a portion of the plurality of data objects is transformed from the at least one digital image using image metadata.

4. The method of claim 1, wherein indicating the one or more particular data objects of the plurality of data objects comprises causing to display the one or more particular data objects in the digital map.

5. The method of claim 1, wherein the input also describes a boundary or time constraint, wherein the one or more particular data objects indicated satisfy the boundary or time constraint based on data property values of the one or more particular data objects.

6. The method of claim 1, wherein each data object of the plurality of data objects is associated with an object type, wherein the input also describes a type constraint, wherein the one or more particular data objects indicated satisfy the type constraint based on object types of the one or more particular data objects.

7. The method of claim 1, wherein the plurality of data objects is represented as a data object graph comprising the plurality of data objects as nodes and relationships of the plurality of data objects as links between the nodes.

8. A non-transitory computer readable medium storing one or more sequences of instructions, which when executed by one or more processors, cause the one or more processors to carry out the steps of:
   transforming field data into a plurality of data objects, wherein the field data includes at least one mobile report or mobile report form generated at a first field device;
   wherein each data object of the plurality of data objects includes one or more data fields and corresponding data property values;
   storing the plurality of data objects into a centralized data repository;
   defining a template with a searchable field type and a suggestible field type;
   receiving an input describing a constraint of a digital map from a second field device, the constraint coming from a first input field having the searchable field type in a particular mobile report form generated at the second field device from the template;

identifying one or more particular data objects of the plurality of data objects that satisfy the constraint;

receiving a selection of a second input field having the suggestive field type in the particular mobile report form;

causing, in response to the selection, display at the second field of information regarding the one or more particular objects as suggestions for the second input field, wherein the method is performed by one or more computing devices.

9. The non-transitory computer readable medium of claim 8, wherein at least a portion of the plurality of data objects is transformed from the at least one mobile report according to a data object relationship definition specified in a report template from which the at least one mobile report is generated.

10. The non-transitory computer readable medium of claim 8, wherein the field data includes at least one digital image generated at a field device, wherein at least a portion of the plurality of data objects is transformed from the at least one digital image using image metadata.

11. The non-transitory computer readable medium of claim 8, wherein indicating the one or more particular data objects of the plurality of data objects comprises causing to display the one or more particular data objects in the digital map.

12. The non-transitory computer readable medium of claim 8, wherein the input also describes a boundary or time constraint, wherein the one or more particular data objects indicated satisfy the boundary or time constraint based on data property values of the one or more particular data objects.

13. The non-transitory computer readable medium of claim 8, wherein each data object of the plurality of data objects is associated with an object type, wherein the input also describes a type constraint, wherein the one or more particular data objects indicated satisfy the type constraint based on object types of the one or more particular data objects.

14. The non-transitory computer readable medium of claim 8, wherein the plurality of data objects is represented as a data object graph comprising the plurality of data objects as nodes and relationships of the plurality of data objects as links between the nodes.

15. A computing system comprising:
one or more computer systems comprising one or more hardware processors and storage media; and
instructions stored in the storage media and which, when executed by the computing system, cause the computing system to perform:
transforming field data into a plurality of data objects, wherein the field data includes at least one mobile report or mobile report form generated at a first field device;
wherein each data object of the plurality of data objects includes one or more data fields and corresponding data property values;
storing the plurality of data objects into a centralized data repository;
defining a template with a searchable field type and a suggestible field type;
receiving an input describing a constraint of a digital map from a second field device,
the constraint coming from a first input field having the searchable field type in a particular mobile report form generated at the second field device from the template;
identifying one or more particular data objects of the plurality of data objects that satisfy the constraint;
receiving a selection of a second input field having the suggestive field type in the particular mobile report form;
causing, in response to the selection, display at the second field of information regarding the one or more particular objects as suggestions for the second input field,
wherein the method is performed by one or more computing devices.

16. The computing system of claim 15, wherein at least a portion of the plurality of data objects is transformed from the at least one mobile report according to a data object relationship definition specified in a report template from which the at least one mobile report is generated.

17. The computing system of claim 15, wherein the field data includes at least one digital image generated at a field device, wherein at least a portion of the plurality of data objects is transformed from the at least one digital image using image metadata.

18. The computing system of claim 15, wherein indicating the one or more particular data objects of the plurality of data objects comprises causing to display the one or more particular data objects in the digital map.

19. The computing system of claim 15, wherein the input also describes a boundary or time constraint, wherein the one or more particular data objects indicated satisfy the boundary or time constraint based on data property values of the one or more particular data objects.

20. The computing system of claim 15, wherein each data object of the plurality of data objects is associated with an object type, wherein the input also describes a type constraint, wherein the one or more particular data objects indicated satisfy the type constraint based on object types of the one or more particular data objects.

* * * * *